US012286785B2

(12) United States Patent
Collins et al.

(10) Patent No.: US 12,286,785 B2
(45) Date of Patent: Apr. 29, 2025

(54) PRE-MANUFACTURED UTILITY WALL FOR A MULTI-STORY BUILDING HAVING LOAD BEARING WALLS

(71) Applicant: Innovative Building Technologies, LLC, Seattle, WA (US)

(72) Inventors: Arlan E. Collins, Seattle, WA (US); Mark L Woerman, Seattle, WA (US); Mark D'Amato, Seattle, WA (US); Eric P. Hinckley, Superior, CO (US); Calder Danz, Seattle, WA (US); Christopher J. Allen, Aloha, OR (US); Dale V. Paul, Poulsbo, WA (US)

(73) Assignee: Innovative Building Technologies, LLC, Seattle, WA (US)

( * ) Notice: Subject to any disclaimer, the term of this patent is extended or adjusted under 35 U.S.C. 154(b) by 104 days.

(21) Appl. No.: 18/248,973

(22) PCT Filed: Oct. 21, 2021

(86) PCT No.: PCT/US2021/056079

§ 371 (c)(1),
(2) Date: Apr. 13, 2023

(87) PCT Pub. No.: WO2022/087285

PCT Pub. Date: Apr. 28, 2022

(65) Prior Publication Data

US 2023/0383515 A1 Nov. 30, 2023

Related U.S. Application Data

(60) Provisional application No. 63/178,515, filed on Apr. 22, 2021, provisional application No. 63/104,239, filed on Oct. 22, 2020.

(51) Int. Cl.
*E04B 5/04* (2006.01)
*B66B 11/00* (2006.01)
(Continued)

(52) U.S. Cl.
CPC ............ *E04B 5/04* (2013.01); *B66B 11/0005* (2013.01); *B66B 19/00* (2013.01); *E04B 1/02* (2013.01);
(Continued)

(58) Field of Classification Search
CPC ..... E04B 5/04; E04B 1/02; E04B 1/08; E04B 1/24; E04B 1/2403; E04B 1/3483;
(Continued)

(56) References Cited

U.S. PATENT DOCUMENTS 3,012,639 A * 12/1961 Pavlecka .................. E04B 5/10
52/275
5,921,046 A 7/1999 Hammond, Jr.
(Continued)

OTHER PUBLICATIONS

USPTO, Written Opinion for International Patent Application No. PCT/US2021/056079, Jan. 21, 2022, 6 pages.
(Continued)

*Primary Examiner* — Rodney Mintz
(74) *Attorney, Agent, or Firm* — IP Spring

(57) ABSTRACT

A utility wall is provided for a multi-story building having load bearing walls that are able to withstand vertical loads and lateral loads. The building may be a low-rise building or a mid-rise building. The utility wall, as well as the load bearing walls, floor-ceiling panels, corridor panels, and other parts of the building, are pre-manufactured off-site and then installed on-site at the site of the building. The utility walls are hung from the load bearing walls and provide utilities to the various stories of the building.

20 Claims, 17 Drawing Sheets

(51) Int. Cl.

| | |
|---|---|
| ***B66B 19/00*** | (2006.01) |
| ***E04B 1/02*** | (2006.01) |
| ***E04B 1/08*** | (2006.01) |
| ***E04B 1/24*** | (2006.01) |
| ***E04B 1/348*** | (2006.01) |
| ***E04B 1/61*** | (2006.01) |
| ***E04B 2/60*** | (2006.01) |
| ***E04B 5/02*** | (2006.01) |
| ***E04B 5/10*** | (2006.01) |
| ***E04B 9/00*** | (2006.01) |
| ***E04B 9/04*** | (2006.01) |

(52) U.S. Cl.

CPC .................. *E04B 1/08* (2013.01); *E04B 1/24* (2013.01); *E04B 1/2403* (2013.01); *E04B 1/3483* (2013.01); *E04B 1/34869* (2013.01); *E04B 1/612* (2013.01); *E04B 1/6125* (2013.01); *E04B 2/60* (2013.01); *E04B 5/10* (2013.01); *E04B 9/008* (2013.01); *E04B 9/04* (2013.01); *E04B 2001/2415* (2013.01); *E04B 2001/2418* (2013.01); *E04B 2001/2451* (2013.01); *E04B 2001/2481* (2013.01); *E04B 2001/6191* (2013.01); *E04B 2001/6195* (2013.01); *E04B 5/02* (2013.01); *E04B 2103/06* (2013.01)

(58) Field of Classification Search

CPC .... E04B 1/34869; E04B 1/612; E04B 1/6125; E04B 2/60; E04B 5/10; E04B 9/008; E04B 9/04

See application file for complete search history.

(56) References Cited

U.S. PATENT DOCUMENTS

| | | | | |
|---|---|---|---|---|
| 8,978,324 | B2 * | 3/2015 | Collins | E04C 2/521 52/404.1 |
| 9,670,669 | B2 * | 6/2017 | Gosling | E04C 2/288 |
| 10,364,572 | B2 * | 7/2019 | Collins | E04C 2/34 |
| 10,584,484 | B2 * | 3/2020 | Cohen | E04B 1/1909 |
| 11,371,242 | B2 * | 6/2022 | May | E04B 1/02 |
| 11,585,091 | B2 * | 2/2023 | May | E04B 1/08 |
| 2004/0200178 | A1 * | 10/2004 | Simmons | E04B 1/24 52/633 |
| 2010/0011699 | A1 | 1/2010 | Weimer et al. | |
| 2011/0296778 | A1 * | 12/2011 | Collins | E04C 2/521 52/745.1 |
| 2014/0069035 | A1 * | 3/2014 | Collins | E04B 2/72 52/745.1 |
| 2015/0300008 | A1 | 10/2015 | Gosling et al. | |
| 2017/0284095 | A1 * | 10/2017 | Collins | E04C 2/322 |
| 2019/0048571 | A1 | 2/2019 | Cohen | |
| 2021/0246652 | A1 * | 8/2021 | May | H02G 3/04 |
| 2021/0404183 | A1 * | 12/2021 | May | E04B 2/58 |
| 2023/0374776 | A1 * | 11/2023 | Shachrur | E04B 1/6116 |
| 2023/0374781 | A1 * | 11/2023 | Collins | E04B 2/60 |
| 2023/0383521 | A1 * | 11/2023 | Collins | E04B 1/3483 |
| 2023/0383523 | A1 * | 11/2023 | Collins | E04B 9/008 |
| 2023/0383526 | A1 * | 11/2023 | Collins | E04B 2/60 |
| 2023/0417046 | A1 * | 12/2023 | Collins | E04B 5/04 |
| 2023/0417049 | A1 * | 12/2023 | Collins | E04B 1/34869 |
| 2024/0026676 | A1 * | 1/2024 | Collins | B66B 19/00 |
| 2024/0318428 | A1 * | 9/2024 | Al-Haboobi | E04C 3/32 |

OTHER PUBLICATIONS

USPTO, International Search Report for International Patent Application No. PCT/US2021/056079, Jan. 21, 2022, 2 pages.

* cited by examiner

PRE-MANUFACTURED UTILITY WALL FOR A MULTI-STORY BUILDING HAVING LOAD BEARING WALLS

CROSS-REFERENCE TO RELATED APPLICATIONS

The present application is the U.S. national phase filing under 35 U.S.C. § 371 of International Patent Application No. PCT/US2021/056079, filed Oct. 21, 2021, which claims priority under 35 U.S.C. § 119(e) and/or under PCT Article 8 to U.S. Provisional Patent Application No. 63/104,239, filed on Oct. 22, 2020, and entitled "LOAD BEARING WALLS FOR A BUILDING" and to U.S. Provisional Patent Application No. 63/178,515, filed on Apr. 22, 2021, and entitled "LOW-MID RISE BUILDING HAVING LOAD BEARING WALLS, UTILITY WALLS, AND A CORRIDOR SYSTEM, AND OTHER ACCOMPANYING STRUCTURE, AND METHOD TO CONSTRUCT THE BUILDING." The contents of U.S. Provisional Patent Application Nos. 63/104,239 and 63/178,515 are incorporated herein by reference in their entirety.

The present application is related in subject matter to each of the following co-pending applications, each of which shares a common filing date of Oct. 21, 2021, entitled "MULTI-STORY BUILDING HAVING LOAD BEARING WALLS AND METHOD TO CONSTRUCT THE BUILDING", "MULTI-STORY BUILDING HAVING PODIUM LEVEL STEEL TRANSFER STRUCTURE", "PRE-MANUFACTURED FLOOR-CEILING PANEL FOR A MULTI-STORY BUILDING HAVING LOAD BEARING WALLS", "PRE-MANUFACTURED LOAD BEARING WALLS FOR A MULTI-STORY BUILDING", "PRE-MANUFACTURED FLOOR-CEILING CORRIDOR PANEL FOR A MULTI-STORY BUILDING HAVING LOAD BEARING WALLS", "MULTI-STORY BUILDING HAVING PREFABRICATED STAIR AND ELEVATOR MODULES", and "PRE-MANUFACTURED FLOOR-CEILING DRAG ANCHOR FOR A MULTI-STORY BUILDING HAVING LOAD BEARING WALLS", all of which are hereby incorporated by reference herein, in their respective entireties.

BACKGROUND

Conventional construction is typically conducted in the field at the building job site. People in various trades (e.g., carpenters, electricians, and plumbers) measure, cut, and install material as though each unit were one-of-a-kind. Furthermore, activities performed by the trades are arranged in a linear sequence. The result is a time-consuming process that increases the risk of waste, installation imperfections, and cost overruns.

Traditional building construction continues to be more and more expensive and more and more complex. Changing codes, changing environments, and new technology have all made the construction of a building more complex than it was 10 or more years ago. In addition, trade labor availability is being reduced significantly. As more and more craftsmen retire, fewer and fewer younger workers may be choosing the construction industry as a career, leaving the construction industry largely lacking in skilled and able men and women to do the growing amount of construction work.

The construction industry is increasingly using modular construction techniques to improve efficiency. Modular construction techniques may include pre-manufacturing complete volumetric units (e.g., a stackable module) or one or more building components, such as wall panels, floor panels, and/or ceiling panels, offsite (e.g., in a factory or manufacturing facility), delivering the pre-manufactured modules or components to a building construction site, and assembling the pre-manufactured modules or components at the building construction site.

While modular construction techniques provide certain advantages over traditional construction techniques, challenges continue to exist in being able meet housing and other building demands in communities. For example, the construction industry, whether using modular construction techniques or traditional construction techniques, needs to be able to address issues such as reducing construction costs and construction waste, reducing time to build, providing building designs that efficiently use space, and other challenges brought on by increasing demands for affordable housing and other building needs.

SUMMARY

An embodiment provides a pre-manufactured utility wall for a multi-story building having load bearing walls. The utility wall includes:

- a plurality of parallel vertical metal studs, including an end stud at each end of the utility wall;
- a vertical member affixed to the end stud, wherein the vertical member includes a plurality of tabs that are sized and shaped for insertion into a corresponding plurality of slots of a vertical support member of a load bearing wall, and wherein the utility wall hangs from the load bearing wall after insertion of the plurality of tabs into the corresponding plurality of slots;
- a horizontal member supported by the vertical member at a first side of the utility wall, wherein the horizontal member runs along a bottom portion of the utility wall, and wherein the utility wall supports a corridor panel when the corridor panel is hung from the horizontal member; and
- utilities installed at a second side of the utility wall that is opposite from the first side of the utility wall, wherein the utilities comprise non-terminated utilities componentry arranged to receive a connection from at least one water source and at least one electricity source.

Another embodiment provides a multi-story building. The building includes:

- a plurality of pre-manufactured load bearing walls that each include a vertical support member; and
- a pre-manufactured utility wall that is hung from and that connects two of the plurality of load bearing walls, wherein the utility wall includes:
  - a plurality of parallel vertical metal studs, including an end stud at each end of the utility wall;
  - a vertical member affixed to the end stud, wherein the vertical member includes a plurality of tabs that are sized and shaped for insertion into a corresponding plurality of slots of the vertical support member of each of the two load bearing walls, and wherein the utility wall hangs from the two load bearing wall after insertion of the plurality of tabs into the corresponding plurality of slots;
  - a horizontal member supported by the vertical member at a first side of the utility wall, wherein the horizontal member runs along a bottom portion of the utility wall, and wherein the utility wall supports a corridor panel when the corridor panel is hung from the horizontal member; and utilities installed at a second side of the utility wall that is opposite from the first side of the utility wall, wherein the utilities comprise non-terminated utilities componentry arranged to receive a connection from at least one water source and at least one electricity source.

Still another embodiment provides method to manufacture a utility wall for a multi-story building. The method includes:

forming a panel frame that includes a plurality of parallel vertical metal studs, wherein the studs include an end stud at each end of the utility wall;

affixing a vertical member to the end stud, wherein the vertical member includes a plurality of tabs that are sized and shaped for insertion into a corresponding plurality of slots of a vertical support member of a load bearing wall of the multi-story building, and wherein the utility wall is hung from the load bearing wall after insertion of the plurality of tabs into the corresponding plurality of slots;

affixing a horizontal member to the vertical at a first side of the utility wall, wherein the horizontal member runs along a bottom portion of the utility wall and is supported by the vertical member, and wherein the utility wall supports a corridor panel when the corridor panel is hung from the horizontal member; and installing utilities at a second side of the utility wall that is opposite from the first side of the utility wall, wherein the utilities comprise non-terminated utilities componentry arranged to receive a connection from at least one water source and at least one electricity source.

DETAILED DESCRIPTION

Figure 1:
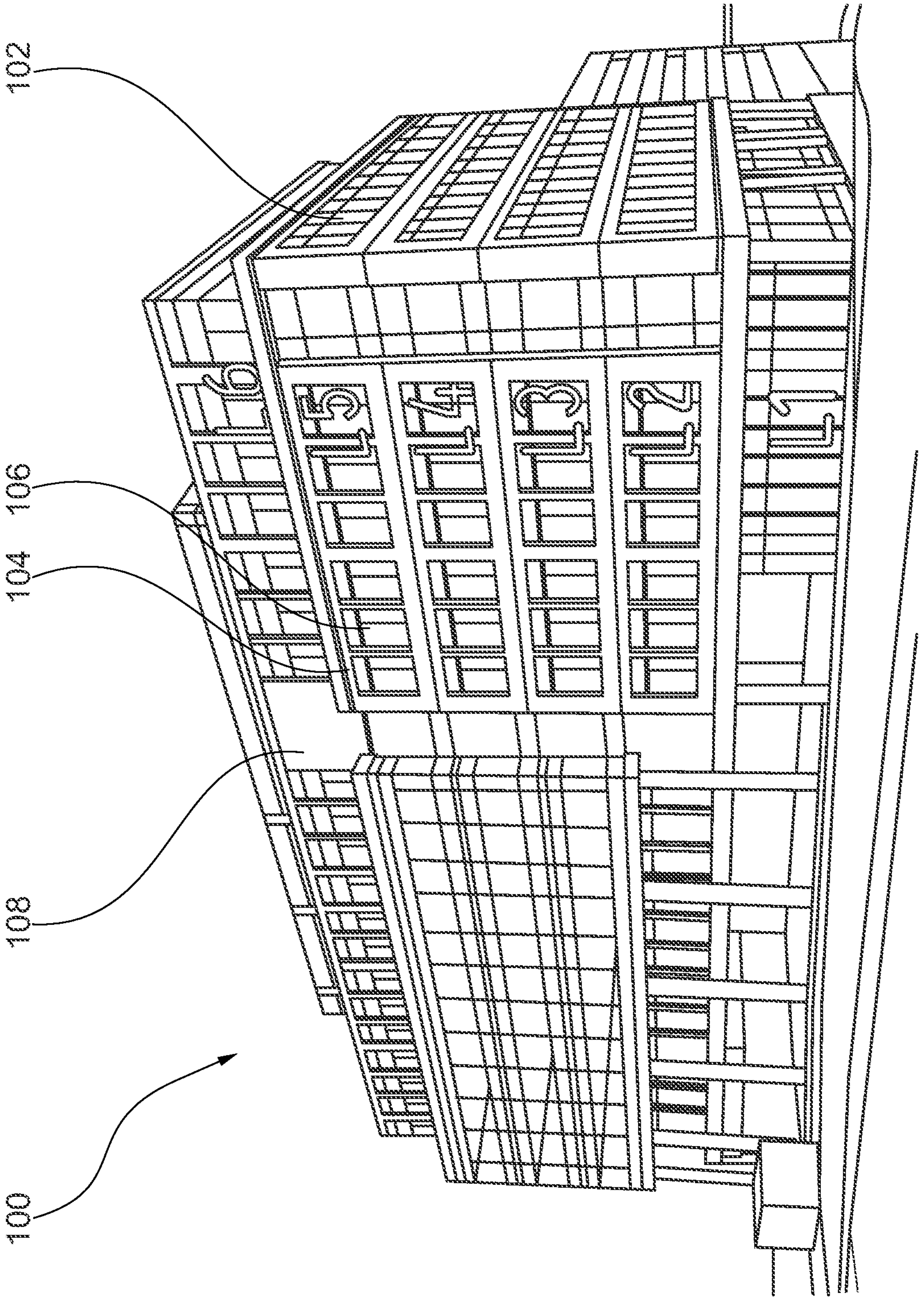
FIG. 1 is an illustration of an example multi-story building that can have pre-manufactured load bearing walls, floor-ceiling panels, utility walls, and other building parts described herein, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are contemplated herein.

This disclosure is drawn, inter alia, to methods, systems, products, devices, and/or apparatuses generally related to pre-manufactured load bearing walls that may be used in multi-story buildings having other pre-manufactured building parts (e.g., floor-ceiling panels, stair and elevator modules, steel transfer structures, corridor panels, etc.), such as a low-rise or mid-rise building. The load bearing walls are structural in that they are able to absorb and/or transfer lateral and/or vertical loads.

Traditionally, buildings are constructed using a steel structural frame that is designed to resist vertical and lateral loads. Thus, the structural frame can be thought of as a skeletal structure of a multi-story building, wherein the structural frame provides structural support for the building by absorbing vertical loads due to the weight of multiple stories and lateral loads such as due to wind or earthquakes, as well as providing the framing for various walls, floors, ceilings, and other components that can be affixed to the structural frame during the course of constructing the building. However, manufacturing and assembling such a traditional and extensive structural frame can be time consuming and costly in terms of labor and material. For instance, an affordable housing crisis or other community needs may dictate that buildings with good structural integrity be built quickly and economically.

Therefore, various embodiments disclosed herein pertain to construction of a building using load bearing walls and other building parts such that the reliance upon a traditional structural frame can be reduced or eliminated, while at the same time enabling the building to meet lateral and vertical loading requirements. The load bearing walls can be pre-manufactured demising walls, end walls, or other vertical walls (including possibly utility walls), at least some of which are constructed and arranged so as to provide the structural support for the building in a manner that is sufficient to enable the building to handle vertical and lateral loads. The other building parts, such as the pre-manufactured floor-ceiling panels and corridor panels and their accompanying components, in combination with the load bearing walls and coupling linkages between them, also enhance the structural integrity for the building (e.g., for handling or transferring loads), improve acoustical performance, and increase fire safety.

The building may be a multi-story low-rise building or a multi-story mid-rise building in some embodiments. Each story of the building can include a single unit or multiple units. For instance, a particular unit may be living space, office space, retail space, storage space, or other human-occupied space or otherwise usable space in the building. In the context of living space, as an example, each story of the building may include multiple units to respectively accommodate multiple tenants.

The use of the pre-manufactured load bearing walls and other pre-manufactured parts enables the building to be constructed with a shorter time to build and at a lower cost (relative to a building that is constructed using a traditional structural frame), and without sacrificing the structural integrity of the building. A pre-manufactured utility wall as described herein refers to a wall or a "wall panel" or simply a "panel" that is pre-manufactured off-site away from the building, including installation of utilities (e.g., plumbing, electrical, etc.) on/in the wall, and then the utility wall is transported to the site of the building for assembly with other building parts during a construction/erection sequence for the building. Single-story utility walls of the building, which may be hung from load bearing walls (such as demising and end walls), provide the utilities to the living spaces of the building as well as horizontally connecting the load bearing walls.

The floor-ceiling panels of the building may be made thinner relative to conventional floor-ceiling panels, thereby enabling the building to have more stories per vertical foot compared to a traditional building, or to have more open space per linear foot when relatively thinner load bearing walls are used. Thus, the building is able to provide more usable space (e.g., living space) as opposed to a traditional building that occupies the same footprint. In other cases, the thinner floor-ceiling panels provide more space between the floor and ceiling of each unit, which may be desirable for some occupants that prefer living spaces with "high ceilings."

In some embodiments, the material composition of an entire module, as well as the wall, ceiling, and floor panels, may include steel. In some embodiments, the material composition may include aluminum. In still other embodiments, the wall, ceiling, and floor panels may be made from a variety of building suitable materials ranging from metals and/or metal alloys, composites, to wood and wood polymer composites (WPC), wood based products (lignin), other organic building materials (bamboo) to organic polymers (plastics), to hybrid materials, earthen materials such as ceramics, glass mat, gypsum, fiber cement, magnesium oxide, or any other suitable materials or combinations thereof. In some embodiments, cement, grout, or other pourable or moldable building materials may also be used. In other embodiments, any combination of suitable building material may be combined by using one building material for some elements of the entire module, as well as the wall, ceiling and floor panels, and other building materials for other elements of the entire module, as well as the wall, ceiling, and floor panels. Selection of any material may be made from a reference of material options (such as those provided for in the International Building Code), or selected based on the knowledge of those of ordinary skill in the art when determining load bearing requirements for the structures to be built. Larger and/or taller structures may have greater physical strength requirements than smaller and/or shorter buildings. Adjustments in building materials to accommodate size of structure, load, and environmental stresses can determine optimal economical choices of building materials used for components in an entire module, as well as the wall, ceiling, and floor panels described herein. Availability of various building materials in different parts of the world may also affect selection of materials for building the system described herein. Adoption of the International Building Code or similar code may also affect choice of materials.

Any reference herein to "metal" includes any construction grade metals or metal alloys as may be suitable (such as steel) for fabrication and/or construction of the entire module, as well as wall, ceiling, and floor panels, and/or other components thereof described herein. Any reference to "wood" includes wood, wood laminated products, wood pressed products, wood polymer composites (WPCs), bamboo or bamboo related products, lignin products and any plant derived product, whether chemically treated, refined, processed or simply harvested from a plant. Any reference herein to "concrete" or "grout" includes any construction grade curable composite that includes cement, water, and a granular aggregate. Granular aggregates may include sand, gravel, polymers, ash and/or other minerals.

FIG. 1 is an illustration of an example multi-story building 100 that can have pre-manufactured floor-ceiling panels, load bearing walls, utility walls, and other building parts (e.g., pre-manufactured corridor panels, window walls, and other type of walls, etc.), in accordance with some implementations. It is noted that the building 100 of FIG. 1 is being shown and described herein as an example for purposes of providing context for the various embodiments in this disclosure. The various embodiments may be provided for buildings that have a different number of stories, footprint, size, shape, configuration, appearance, etc. than those shown for the building 100.

The building 100 may be a multi-story building with one or more units (e.g., living, office, or other spaces) in each story. In the example of FIG. 1, the building 100 has six stories/levels/floors, labeled as levels L1-L6. Also as shown in FIG. 1, the building 100 has a generally rectangular footprint, although the various embodiments disclosed herein may be provided for buildings having footprints of some other shape/configuration. Moreover, each story may not necessarily have the same shape/configuration as the other stories. For instance in FIG. 1, level L6 of the building 100 has a smaller rectangular footprint relative to levels L1-L5.

The ground floor level L1 may contain living spaces, office spaces, retail spaces, storage spaces, common areas (such as a lobby), etc. or combination thereof. Levels L2-L6 may also contain living spaces, office spaces, retail spaces, storage spaces, common areas, etc. or combination thereof. Such spaces may be defined by discrete units, separated from each other and from corridors or common areas by interior demising walls and utility walls (not shown in FIG. 1). An individual unit in turn may be made up of multiple rooms that may be defined by load bearing or non-load bearing walls. For example, a single unit on any given level may be occupied by a tenant, and may include a kitchen, living room, bathrooms, bedrooms, etc. separated by walls, such as demising walls or utility walls. There may be multiple units (e.g., for multiple respective tenants) on each story, or only a single unit (e.g., for a single tenant) on a single story.

Each end of the building 100 includes an end wall 102. One or more panels that make up the end wall 102 may span a single story in height. Any of the sides of the building 100 may include an end wall or a window wall 104 that accommodates a window 106, such as window(s) for unit(s). One or more panels that make up the window wall 104 may span a single story in height. Some parts of the building 100 may include an end wall devoid of windows (e.g., not a window wall), such as an end wall 108, which may be comprised of a panel that spans one story of the building 100.

The unit(s) in each story may be formed using either an entire pre-manufactured module or from one or more pre-manufactured floor-ceiling panels (not shown in FIG. 1) and wall panels, and the units may also adjoin each other via hallways having pre-manufactured corridor panels used as floor-ceiling panels. A floor-ceiling panel may form the floor of a first unit and a ceiling of a second unit below the first unit, and may also be used to form part of the roof of the building 100 when used as the ceiling panel for the top floor. The pre-manufactured wall panels may be used to form interior walls (e.g., demising walls, utility walls along a corridor, which may be utility walls, etc.), window walls (e.g., exterior window wall 104 that accommodate one or more windows 106), utility walls (e.g., walls with utilities such as plumbing and electrical wiring contained therein), end walls, etc. According to various embodiments, at least some of these panels may be pre-manufactured off-site such as at a factory, and then installed on site by coupling them together to construct the building 100. The various components of such panels and how such panels are attached to each other will be described later below.

The sides of interior walls that face the interior space (e.g., living space) of the building 100 may be covered by a finish panel, such as wall paneling, for decorative and/or functional purposes. Analogously, the tops and bottoms of floor-ceiling panels that face the interior space (e.g., living space) of the building 100 may also be covered with laminate flooring, finish panels, tile, painted/textured sheathing, etc. for decorative and/or functional purposes. For exterior walls such as end walls and window walls, the sides of these walls facing the outside environment may be covered with waterproofing membranes, tiles, glass, or other material for decorative and/or functional purposes.

According to various implementations, the building 100 is constructed using load bearing walls (such as demising walls, end walls, etc.). In this manner, such walls are able to support vertical loads, and non-shear walls are able to transfer lateral loads and shear walls are able to transfer and resist lateral loads. Because these walls are load bearing components, the building 100 can eliminate or reduce the use of an extensive steel structural frame in at least some of the levels. For instance, a steel structural frame (e.g., made of an array of beams and columns to which each and every floor-ceiling panel and wall are directly attached) may be absent in levels L2-L6. A steel structural frame may be used in level L1 and/or further structural reinforcement may be given to load bearing walls that are used in level L1 alternatively or in addition to a structural frame, so as to provide structural integrity at ground level.

The building 100, having six levels L1-L6, is defined in some jurisdictions as a mid-rise building (e.g., buildings having six to 12 levels). Buildings having five levels and under are defined in some jurisdictions as a low-rise building. The various embodiments of the load bearing walls described herein may be used in low-rise and mid-rise buildings. Such low-rise and mid-rise buildings may have various fire ratings, with a 2-hour fire rating for mid-rise buildings of six stories or more and a 1-hour fire rating for buildings of five stories or less being examples for some of the buildings that use the load bearing walls described herein.

In some embodiments, the load bearing walls and other building parts described herein (in the absence of a structural frame, or with a reduced amount thereof) may be used for buildings that have a greater number of stories than a typical low-rise or mid-rise building. In such embodiments, the load bearing walls and/or other building parts described herein may be implemented with additional and/or modified structural components, so as to account for the increased load associated with the greater number of stories.

Figure 2:
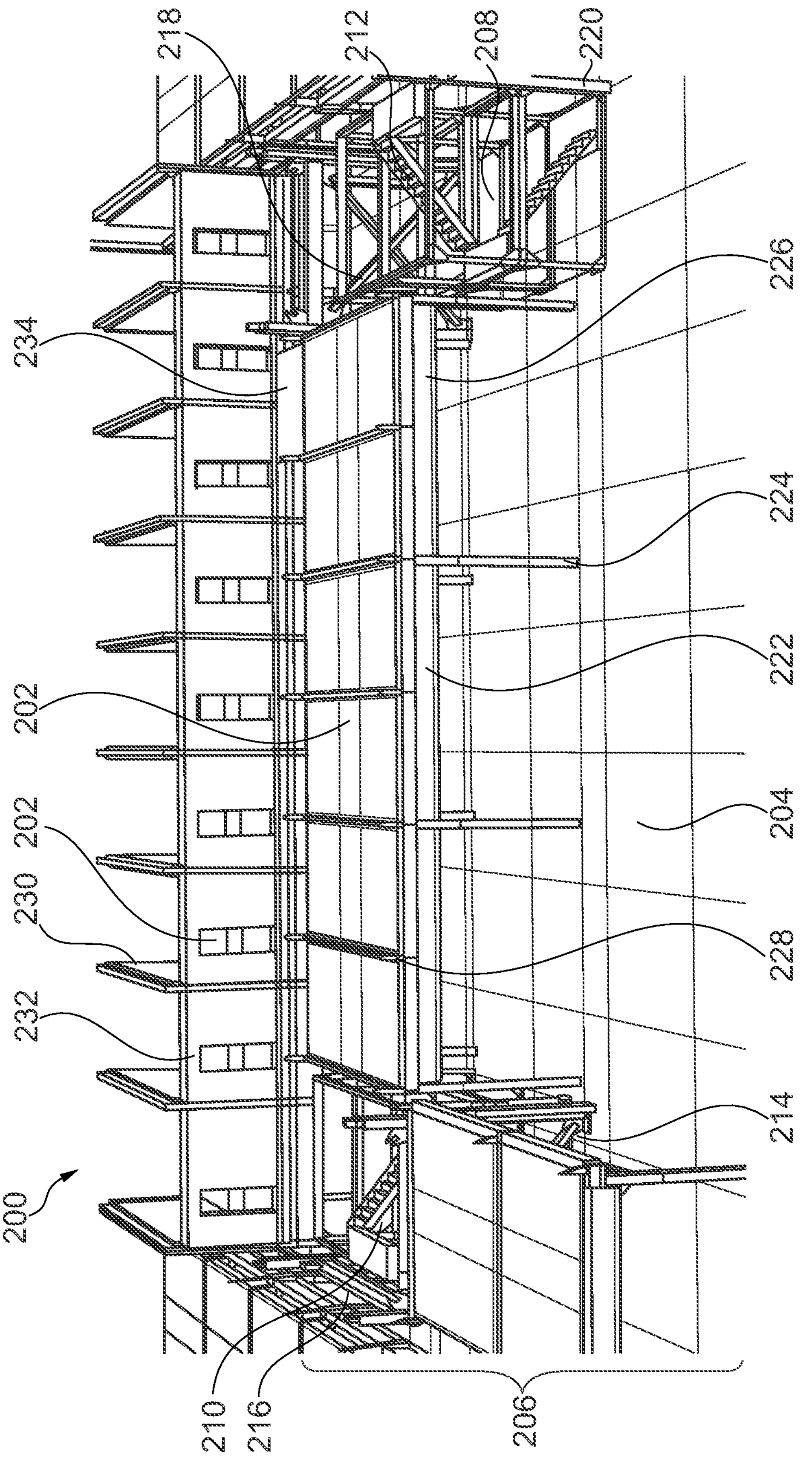
FIG. 2 shows a partially constructed building having load bearing walls, floor-ceiling panels, and utility walls at a second floor level of the building, in accordance with some implementations.

FIG. 2 shows a partially constructed building 200 having floor-ceiling panels 202, load bearing walls 230, and utility walls 232 at a second floor level (L2) of the building, in accordance with some implementations. For purposes of example and illustration, the building 200 has a generally rectangular footprint, and is assumed to be a low-rise building having at most five stories (floor levels), and it is understood that the various implementations described herein may be used for buildings with other numbers of stories. A construction sequence described with respect to FIG. 2 and in the other figures may be adapted to construct buildings having other shapes, sizes, heights, configurations, number of stories, etc., such as the building 100 of FIG. 1 or any other building where load bearing walls, floor-ceiling panels, utility walls, and the other building parts described herein are installed in the absence of extensive structural frames on at least some stories. In some embodiments, the various operations in the construction sequence may be performed in a different order, omitted, supplemented with other operations, modified, combined, performed in parallel, etc., relative to what is shown and described with respect to FIG. 2 and the other figures.

To describe a construction sequence to arrive at the partially constructed building 200 in FIG. 2, a foundation 204 is first formed. The foundation 204 may be a steel reinforced concrete slab that is poured on the ground to define a footprint 206 of the building 200, or may be some other type of shallow or deep foundation structure. Furthermore, excavation of the ground may also be performed to form a basement and/or elevator pit(s) 208 that form part of one or more elevator shafts to accommodate one or more elevators.

Next in the construction sequence, pre-manufactured stair and elevator modules 210 and 212 may be built on the foundation 204, and positioned such that the elevator portions of the modules 210 and 212 that will contain the elevator shaft are superimposed over the elevator pit(s) 208. The modules 210 and 212 according to various embodiments may be two stories in height, and there may be one or more of these modules per building, with two modules 210 and 212 shown by way of example in FIG. 2.

Each of the modules 210 and 212 may be comprised of vertical columns made of steel, and horizontal beams spanning between the columns and also made of steel. Thus, the columns and the beams form a structural frame, which according to various embodiments is a load bearing structure that is able to withstand some vertical and lateral loads. In other embodiments, the columns may be replaced by load bearing wall panels and the beams may remain as load bearing rings.

The modules 210 and 212 of various embodiments are positioned at specific locations of the foundation 204. In the example of FIG. 2, the modules 210 and 212 are positioned on opposite sides of the building 200. Other configurations may be used, such as positioning one or more modules at a central location in the building footprint 206 or at any other suitable location(s) on the building footprint 206.

Next in the construction sequence, braced frames are installed on the foundation 204 in relation to the modules 210 and 212. For example, braced frames 214 and 216 are arranged perpendicularly around and in close proximity to the module 210, such that the module 210 is nested by the braced frames 214 and 216. With respect to the module 212, braced frames 218 and 220 are also arranged perpendicularly relative to each other but are spaced away from the module 212 by a greater distance.

The braced frames 214-220 may be arranged on the foundation 204 in any suitable location and orientation, dependent on factors such as the footprint or configuration of the building 200, source of lateral and/or vertical loads, location/orientation for optimal stabilization, etc. Any suitable number of braced frames may be provided at the ground level. The braced frames may further vary in configuration. The example of FIG. 2 depicts some braced frames (e.g., the braced frame 218) that are generally planar in shape (made of two columns and at least one horizontal beam that joins the two columns), with cross beams (X shaped beams) at the center of the braced frames. The braced frames 214-220 may span one, two, or other stories in height or intermediate heights, and multiple braced frames may also be vertically coupled.

According to various embodiments, the modules 210 and 212 are used as erection aids that guide the positioning and orientation of the braced frames 214-220 during construction. For instance, the modules 210 and 212 are installed first, and then the braced frames 214-220 are arranged relative to the location of the modules 210 and 212. The braced frames may be directly welded (or otherwise attached/connected) to the modules, or may be linked to the module(s) over a distance via linking beams or other structural framing. In this manner, the modules 210 and 212 stabilize the braced frames 214-220, and the braced frames 214-220 can operate to also absorb vertical and lateral loads from the building 200 via their linking connections.

The next phase of the construction sequence involves the erection of a steel transfer structure 222 (e.g., a podium structure) at ground level. The steel transfer structure 222 comprises a steel frame that receives and transfers load to the foundation 204 and to the braced frames 214-220. The steel transfer structure 222 may have vertical members 224 (columns) having a height that spans one story, girders 226 that join pairs of columns 224, and beams 228 that perpendicularly join pairs of girders 226. The steel transfer structure 222 may further include vertically oriented "spigots" and/or other protrusions or engagement features to aid in construction, as will be described more fully below.

After completion of the steel transfer structure 222, the next phase of the construction sequence involves the placement/installation of the floor-ceiling panels 202 over consecutive beams 228, and more specifically, hanging the floor-ceiling panels 202 onto the beams 228. A floor deck comprised of floor-ceiling panels 202 on the second floor level L2 thus results after such installation.

Afterwards, the load bearing walls 230 (e.g., demising walls and end walls) are installed by being positioned over the beams 228, and utility walls 232 are then installed by being hung onto the load bearing walls 230. Next, corridor panels 234 (which may be formed similarly in some respects as the floor-ceiling panels 202) are hung from the utility walls 232. The construction sequence described above then repeats for each consecutive upper floor level.

Figure 3:
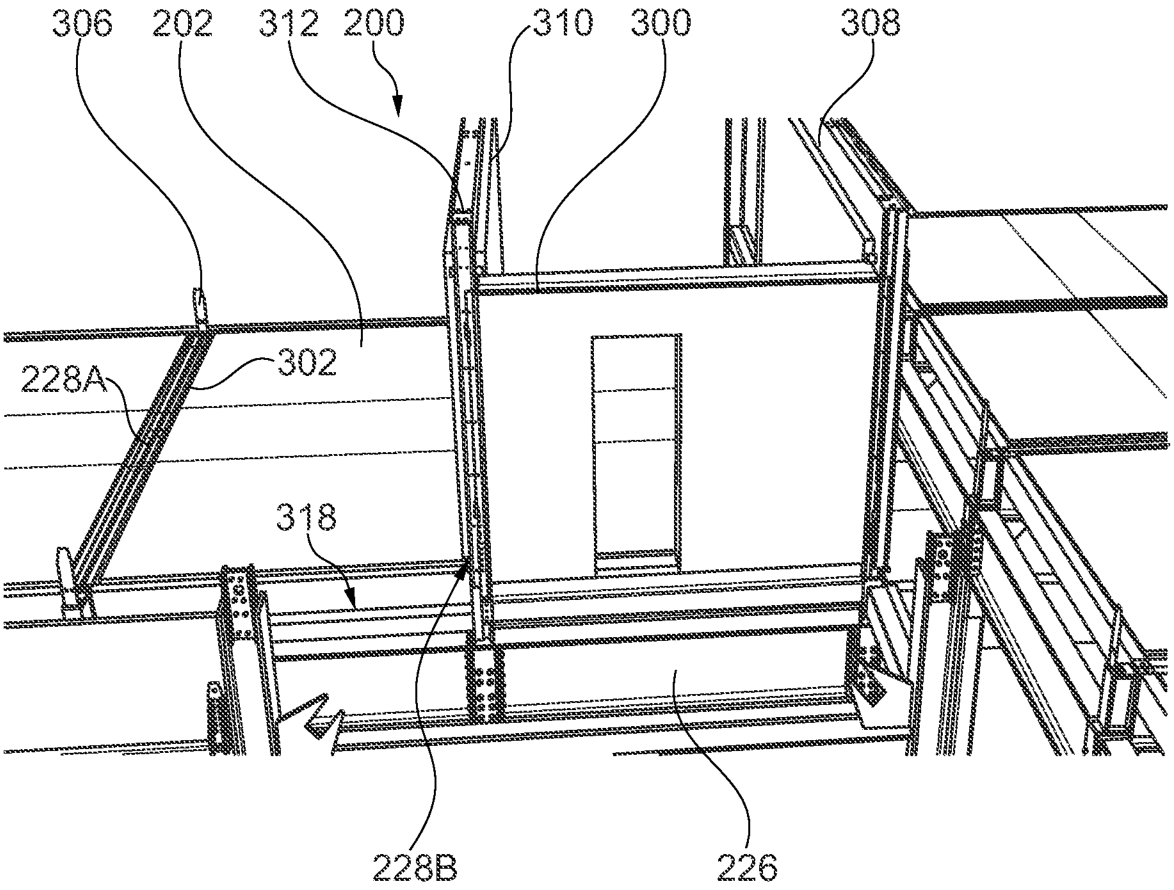
FIG. 3 shows further details of a utility wall hung onto load bearing walls of the partially constructed building of FIG. 2, in accordance with some implementations.

FIG. 3 shows further details of a utility wall 300 hung onto load bearing walls of the partially constructed building of FIG. 2, in accordance with some implementations. The example of FIG. 3 shows the utility wall 300 (which may be a similar/same type of wall as the utility wall 232 of FIG. 2) being hung from an end wall 308 and a demising wall 310 that are oriented in parallel, so as to form an orthogonal connection between the end wall 308 and the demising wall 310. Then, moving horizontally along the interior of a corridor/hallway, multiple utility walls 300 may be sequentially hung from demising walls 310 up to a final end wall.

FIG. 3 shows an example mounting of a plurality of floor-ceiling panels 202 and the various walls, wherein if the north-south direction along the beams 228A and 228B is considered to be a transverse direction, and if the east-west direction along the girder 226 is considered to be the longitudinal direction, then the floor-ceiling panel 202 includes an angle 302 (or other piece of metal that provides a ledge-like structure) that runs along its transverse direction along an upper surface (upper corner edge) of the floor-ceiling panel 202. It is understood that the terms longitudinal and transverse are used as relative terms herein for the sake of convenience in describing perpendicular/orthogonal relationships between two components in the various embodiments, and may be swapped if the building 200 is being viewed or described from a different point of reference.

The angle 302 includes a horizontal section that rests on a top surface of the beam 228A. A vertical section of the angle 302 is attached to a vertical edge of the floor-ceiling panel 202. A similar angle 302 is attached to the other/opposite transverse edge of the floor-ceiling panel 202, and also has a horizontal section that rests on top of a beam 228B adjacent to that edge of the floor-ceiling panel 202. In this manner, the floor-ceiling panel 202 is hung by its transverse edges between two consecutive beams 228. For the next story above, the horizontal sections of the angles of the floor-ceiling panels at that next story will rest on top surfaces of the end wall 308 and demising walls 310 erected along the corridor.

With such an arrangement, the floor-ceiling panels 300 each provide a diaphragm that absorbs lateral and/or vertical load(s) and then transfers the load(s), via the angle 302, to the beams 228 of the steel transfer structure 222 and/or to other supporting structure linked to the angles 302. The steel transfer structure 222 then transfers the load(s) via one or more load paths to the foundation 204 and/or to the braced frames (e.g., the braced frames 214-220) via connecting links.

According to some embodiments, the floor-ceiling panels 202 are supported between beams 228 along their transverse sides and are unsupported (e.g., by the girders 226 or other structures) along their longitudinal sides. Load bearing walls (e.g., the end wall 308 and demising wall 310 of FIG. 3) are positioned along and over the transverse sides/edges of the floor-ceiling panels 202, such as also depicted by the walls 230 in FIG. 2.

Both of the walls 308 and 310 are load bearing walls. The end wall 308 is also a shear wall (but may not be a shear wall in some situations), and the demising wall 310 may or may not be a shear wall. In general, various structural configurations may be used to enable a wall to be a shear wall so as to resist in-plane shear and overturning. For example, stronger stud configurations or wall material may be used, as well as more dense screw patterns for attaching metal sheets to the walls and augmentation of vertical connections between panels at end studs (tubes).

For example in FIG. 3, the demising wall 310 and the end wall 308 may each include a tubular member 312, such as a hollow structural section (HSS) tube, or other type of vertical support member affixed along both of its vertical proximal and distal edges. As the wall 308/310 is being lowered into position, spigots 306 (located adjacent to both ends of the beam 228 on the second floor level, and further spigots 306 are affixed to top surfaces of load bearing walls for subsequent upper floor levels) are inserted into the openings of the lower ends of the tubular members 312. The wall 308/310 is then secured in place by tightening attachment bolts that join the tubular members 312 to the spigots 306. This process is repeated for next subsequent upper floor levels, wherein the spigots 306 at each floor level are used for both alignment and stabilization of the walls being lowered on top of the spigots 306, and then such walls are held in place via bolts that attach the tubular member 312 of these walls to the spigots 306.

The tubular members 312 of the load bearing walls also serve as an attachment member from which utility walls 232/300 are hung, such as shown in FIG. 3. The manner in which to hang utility walls from the tubular members 312 of load bearing walls will be described in further detail below, with respect to FIGS. 5-8 and other figures.

FIG. 3 further shows a gap 318 between the vertical edge of the floor-ceiling panel 202 and a plane formed by an interior vertical edge of the girder 226. Thus gap 318 (and similar gaps for the next stories above and along the corridor on the same story) provide access to and/or space for interconnection between utilities of adjoining vertically arranged utility walls. The interconnection between utilities provided by adjoining vertically arranged (single-story) utility walls will described be later below.

Figure 4:
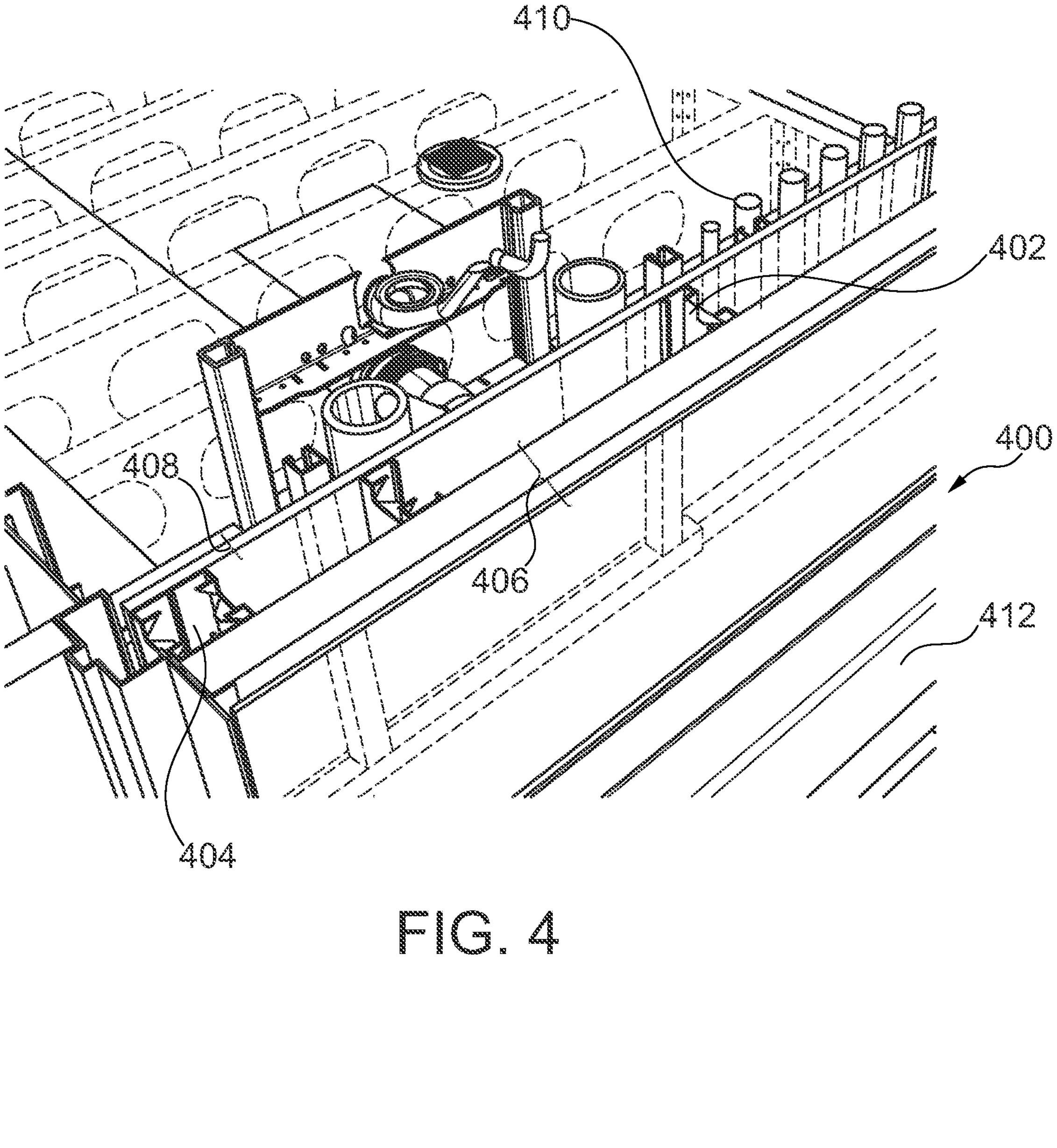
FIG. 4 is a cutaway view showing further details of a utility wall, in accordance with some implementations.

FIG. 4 is a cutaway view showing further details of a utility wall 400, in accordance with some implementations. The utility wall 400 may be similarly constructed/manufactured (off-site at a factory) as the utility walls 232, 300, and other utility walls that are shown and described throughout this disclosure.

The cutaway top view of FIG. 4 shows a framing structure (panel frame) of the utility wall 400. The panel frame is comprised of a plurality of vertically arranged parallel metal studs 402. C-channels or other profile/configuration/types of metal studs may be used as the studs 402. The studs 402 may have any suitable vertical length, gauge or wall thickness, horizontal dimensions (e.g., nominally 2 inches by 4 inches, or 3⅝ inches by 1⅝ inches, with various gauges/thicknesses possible), configuration/shape, etc. The studs 402 may be spaced apart by distances such as 16 inches, 18 inches, 21 inches, etc. on center.

In the example of FIG. 4, the outermost (end) stud 404 may be formed using two C channels arranged face-to-face. Other configurations are possible, including one or more tubular rectangular studs. The top and bottom sides of the panel frame of the utility wall 400 each may be covered by a track (such as a C channel, not shown in FIG. 4) that is affixed to the top/bottom ends of the studs 402/404.

On a first side of the utility wall 400 that faces a corridor, the utility wall 400 includes layers 406. The layers 406 of various implementations may include a first sheet of metal (e.g., a steel sheet) of any suitable gauge/thickness affixed to the studs 402/404 by screwing or other attachment method, a sheathing (e.g., 1.5 inches thick) comprised of a structurally insulated sheathing (SIS) layer or foam layer or other material, and a magnesium oxide layer adhered thereto. The first sheet of metal in combination with the sheathing provides, in addition fire-resistance and sound proofing capabilities and an air barrier between exterior and interior surfaces.

On a second side (opposite to the first side) of the utility wall 400 that faces the living space, the utility wall 400 includes layers 408. The layers 408 of various implementations may include a second sheet of metal (e.g., a steel sheet) of any suitable gauge/thickness affixed to the studs 402/404 by screwing or other attachment method. One or more magnesium oxide layers and/or other sheathing material in the layers 408 are affixed to the second sheet of metal, on a side of the second sheet of metal that faces the living space, so as to also provide fire resistance and sound proofing capabilities and an air barrier between exterior and interior surfaces. Further layers that overlie the layers 408 may be present in other embodiments (e.g., finish panels, etc.), which may be installed off site or on site.

A plurality of vertically running utilities 410 are also arranged (off site) on the side of the second sheet of metal that faces the living space, in a vertical plane that is spaced from the vertical plane of the studs 402. Thus, the utilities 410 are not contained within the panel frame formed by the studs 402. That is, for example, the utilities 410 do not occupy the interstitial cavities/spaces between the studs 402, but rather are arranged outside of these interstitial cavities/spaces.

In one implementation, the utilities 410 may be at least temporarily capped with protective caps or coverings such that terminal ends of the utilities 410 are not damaged during shipping. Furthermore, as the utilities 410 may be advantageously arranged in relation to the interstitial cavities, with at least temporary caps or coverings, the entire utility wall 400 may be flat-packed in vertical position for shipment from a manufacturing facility to a job site for building construction. The at least temporary caps or coverings may comprise any suitable material, including shrink wrap, foam, bubble-wrap, plastic capping, rubber capping, plugs, grommets, and/or any other suitable temporary protective measures. Upon receipt at a job site, any protective coverings may be removed for installation. It is noted that if temporary caps or coverings are omitted, in some circumstances, utilities may be flushed and/or cleaned to remove debris from shipping/manufacturing. Finally, after removal of temporary protection and/or cleaning, the utilities may be terminated during installation as will be described in further detail below.

Such utilities and related components may include water lines (e.g., for drinking, washing, supplying to radiant heating/cooling systems, etc.), drain pipes, conduits, wiring for electrical and communication, and so forth. Further details regarding the utilities 410, and the manner in which they are mounted to the side of the utility wall 400 that faces the living space, will be provided later below. During on site installation, after the utility wall 400 has been hung to load bearing walls and after the utilities 410 are interconnected, a finish panel (not shown in FIG. 4) may be attached to the utility wall 400 to conceal the utilities 410. Other layers may also be present, in addition to what has been described herein for the layers 408.

On a side of the utility wall 400 that faces the corridor, a horizontal member 412 is attached during off-site manufacturing in some implementations and runs at floor level along the length of the utility wall 400. The horizontal member 412 serves as a mounting platform for corridor panels 234 that will be hung from the utility wall(s) 400 during field installation on site. Further details of the horizontal member 412 and how it is attached (during off-site manufacturing) to the utility wall 400 will be hanging described in further detail later below, as well as a description of the on-site installation to link multiple horizontal members 412 of adjacent utility walls 400 together and to hang corridor panels therefrom. The horizontal member 412 may be an HSS tube of dimensions of 8 inches by 4 inches by ¼ inches thick, as a possible example.

Figure 5:
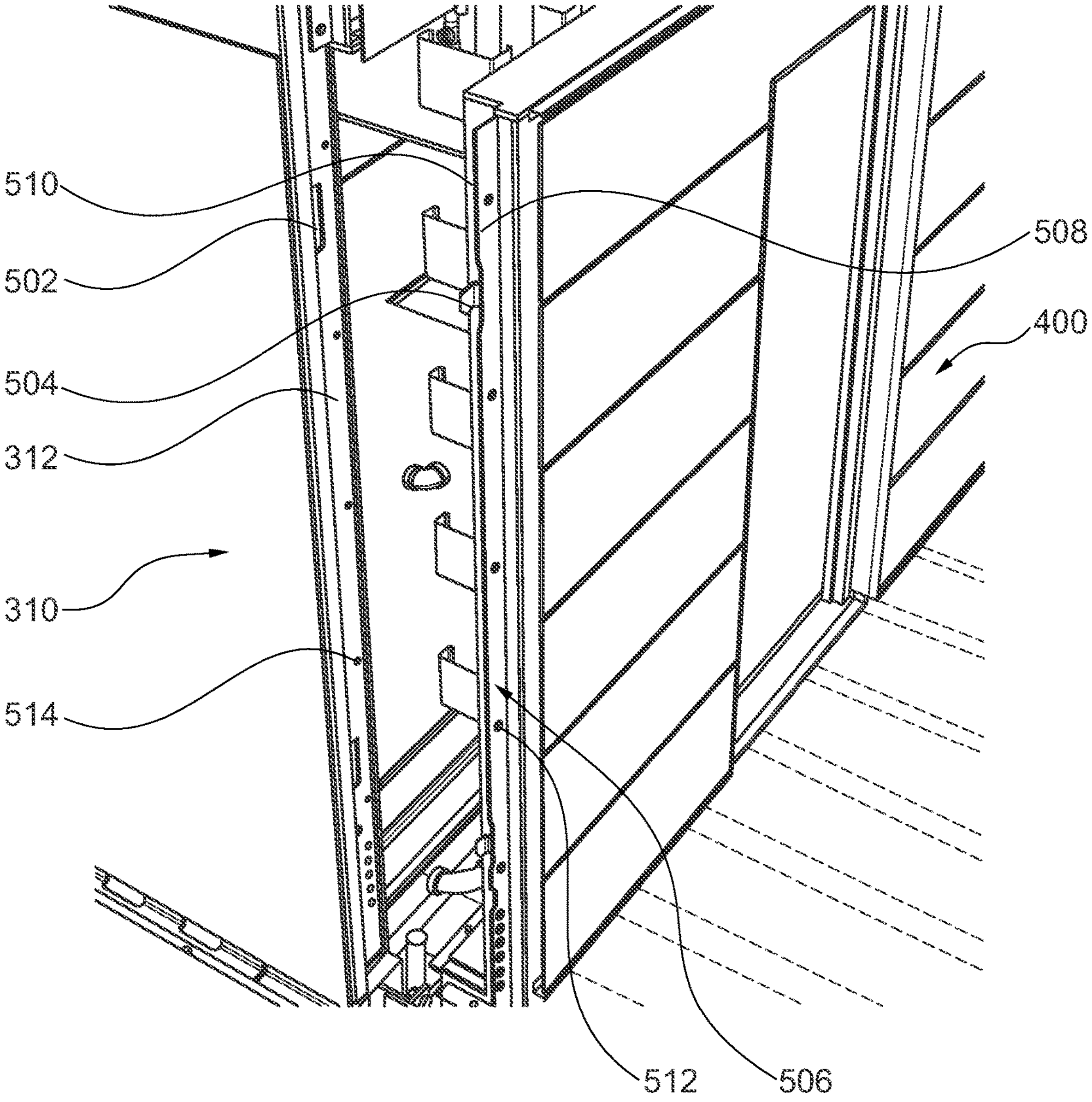
FIG. 5 shows components of a utility wall that are used to hang the utility wall from a load bearing wall, in accordance with some implementations.

FIG. 5 shows components of a utility wall (e.g., the utility wall 400) that are used to hang the utility wall 400 from a load bearing wall (e.g., the demising wall 310) during field installation, in accordance with some implementations. More particularly, FIG. 5 show the components of the utility wall 400 that are installed off-site, and then used later (on-site) during field installation to hang the utility wall 400 from load bearing walls.

For the load bearing wall 310, the tubular member 312 of the wall 310 is formed with a plurality of slots 502. The slots 502 are sized and shaped to receive a corresponding plurality of tabs 504 of the utility wall 400.

According to various embodiments, the utility wall 400 includes an angle 506 that runs along both of its vertical edges/sides. The angle 506 includes or is formed with the plurality of tabs 504 that fit into corresponding slots 502 of the wall 310 during field installation.

The angle 506 may be a folded or hot-rolled piece of steel of any suitable gauge/thickness (e.g., 12 gauge, 14 gauge, 16 gauge, etc., or ⅛ inch, ¼ inch etc. in thickness), with a first vertical section 508 and a second vertical section 510 that are orthogonal to each other. The tabs 504 are formed and positioned at/in the first vertical section 508, along with holes 512 that run through the first vertical section 508.

The tabs 504 may have any suitable shape. For example, the tabs 504 may have a tapered shape so as to be more easily inserted into the slots 502 during field installation. The tabs 504 may also have a hook-shaped configuration in some implementations, so as to provide more secure placement. In still other implementations, the tabs 504 may be located on the wall 310 (e.g., as upward facing hooks), and the slots 502 may be located on the utility wall 400.

During off site manufacturing, the second vertical section 510 is affixed to the end stud 404 (shown in FIG. 4) of the wall 400, such as via screwing, welding, or other attachment technique. Then, during field installation, the utility wall 400 is lowered (e.g., via a crane) towards the wall 310, and hung into position by inserting the tabs 504 into corresponding slots 502 of the wall 310.

Further attachment mechanisms may be used thereafter to hold the utility wall 400 in place. For instance, the tubular member 312 of the wall 310 may have a plurality of holes 514, some of which may be alignment holes and some of which may be holes to receive fasteners (such as screws or bolts) that are inserted into the corresponding holes 512 formed in the angle 506 of the utility wall 400 and then tightened, thereby further securely attaching the utility wall 400 to the wall 310.

Figure 7:
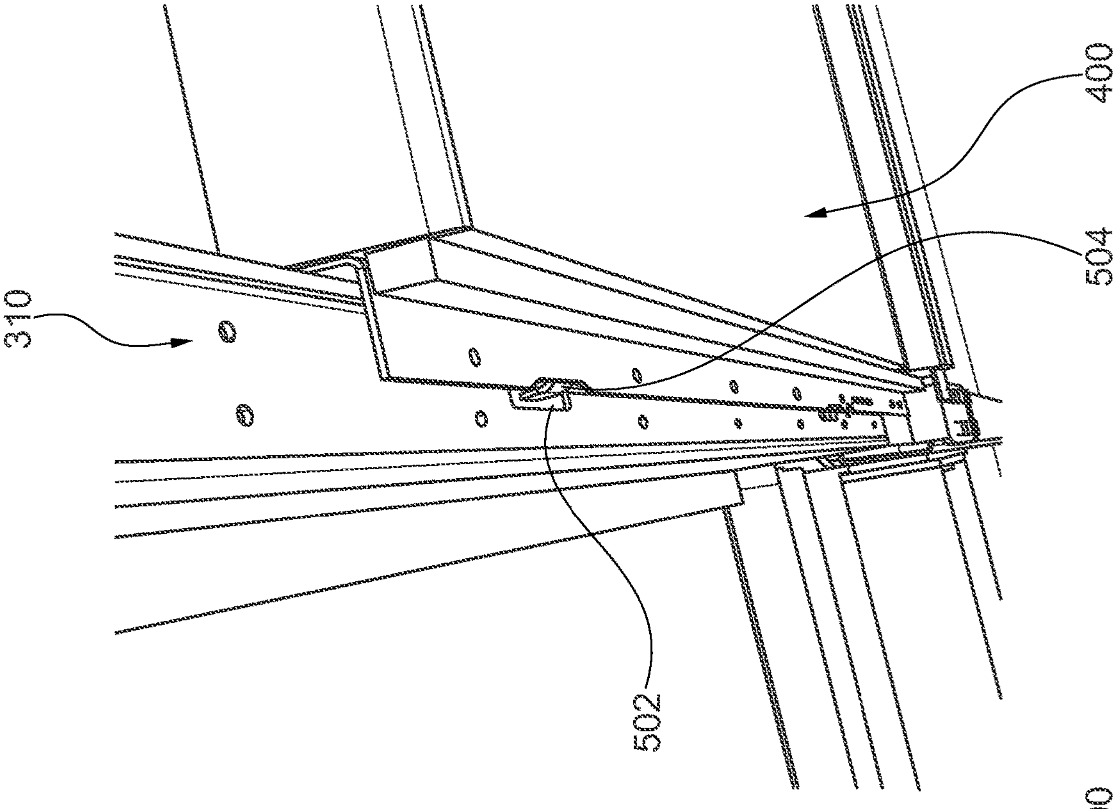
FIGS. 6 and 7 show the utility wall of FIG. 5 hung onto the load bearing wall, in accordance with some implementations.
Figure 6:
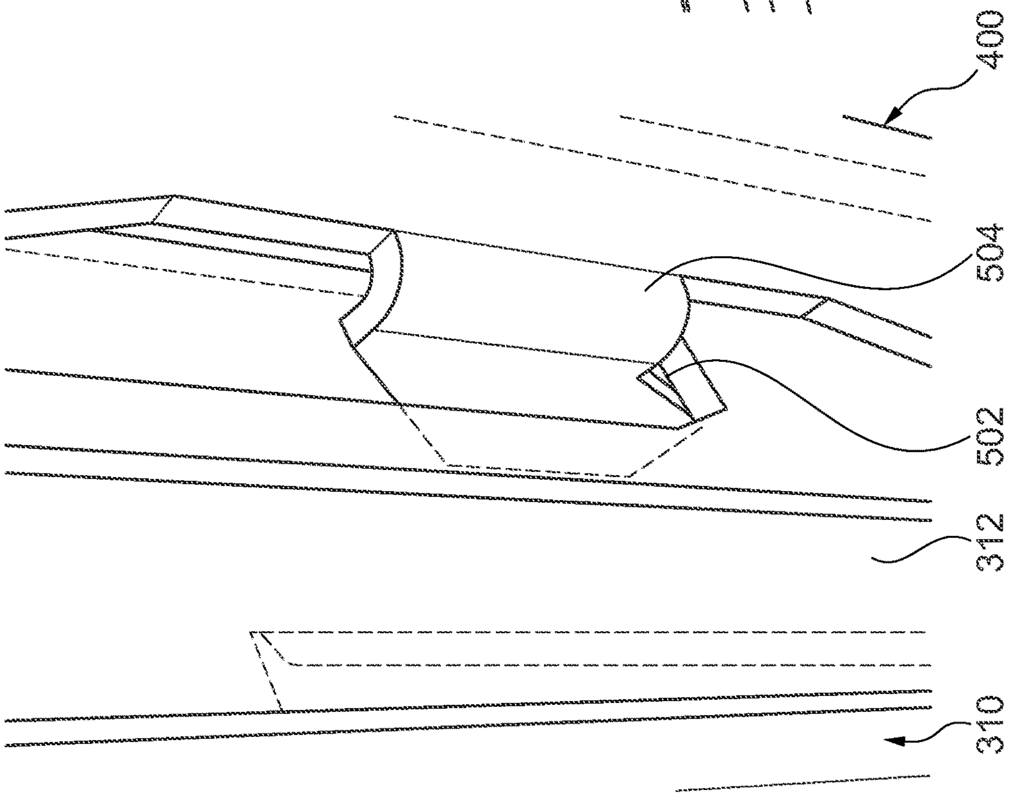

FIGS. 6 and 7 show the utility wall 400 of FIG. 5 hung onto the load bearing wall 310, in accordance with some implementations. In FIG. 6, the tab 504 has a downward hook shape, such that when the tab 504 is inserted into the slot 502 of the tubular member 312 of the wall 310, the weight of the utility wall 400 hooks the tab 404 firmly against the lower edge of the slot 502. FIG. 7 shows the utility wall 400 in its fitted/hung position against the wall 310, via the tabs 504 and slot 502.

Figure 8:
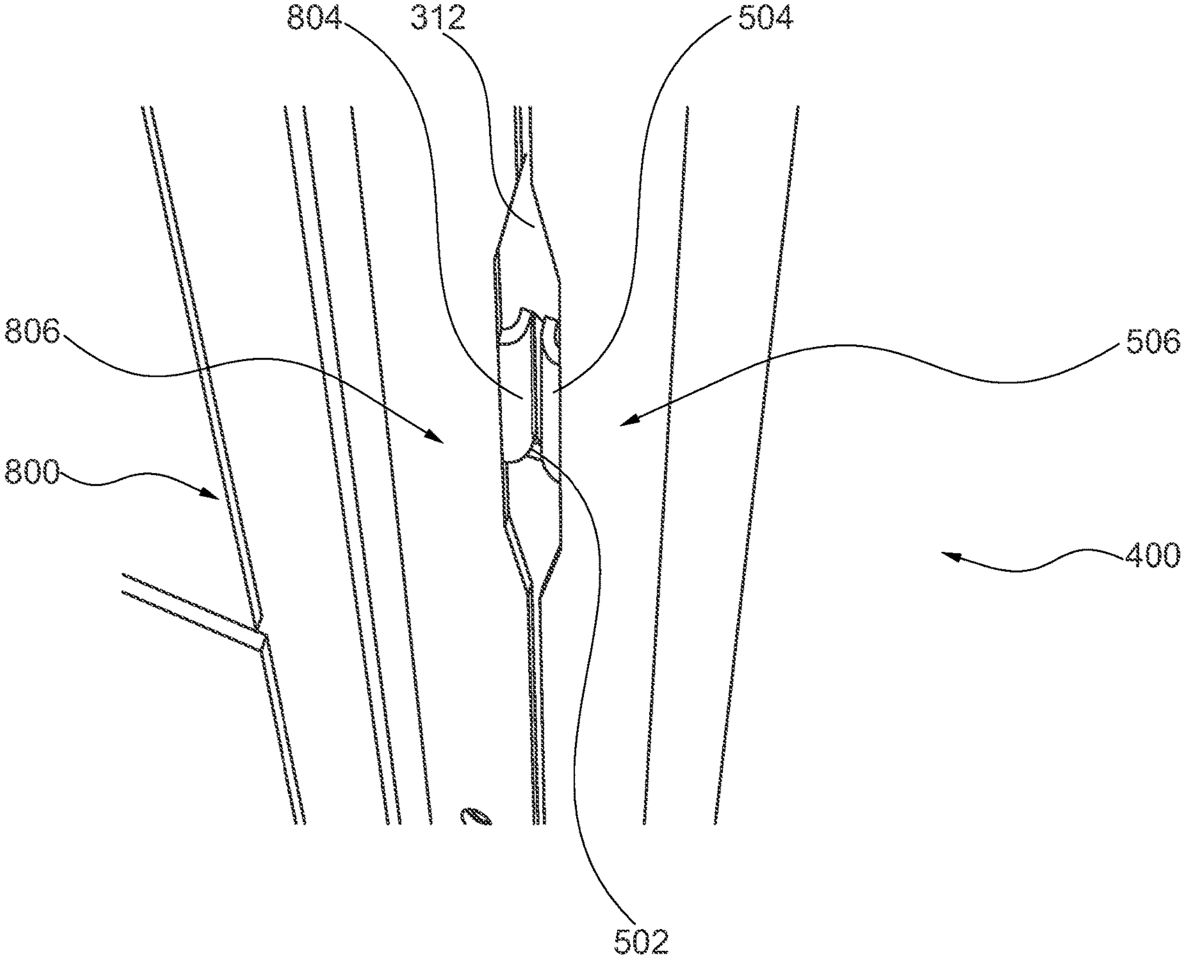
FIG. 8 shows two utility walls hung from a common slot, in accordance with some implementations.

FIG. 8 shows two utility walls hung from a common slot, in accordance with some implementations. For instance and as previously described above, the utility wall 400 is hung from the tubular member 312 of the utility wall 310, by inserting the tab 504 of the angle 506 into the slot 502.

A utility wall 800 adjacent to the utility wall 400 (e.g., to the left of the utility wall 400) also includes an angle 806 having a tab 804. The utility wall 800 is also hung from the same tubular member 312, by inserting the tab 804 into the common slot 502.

Figure 9:
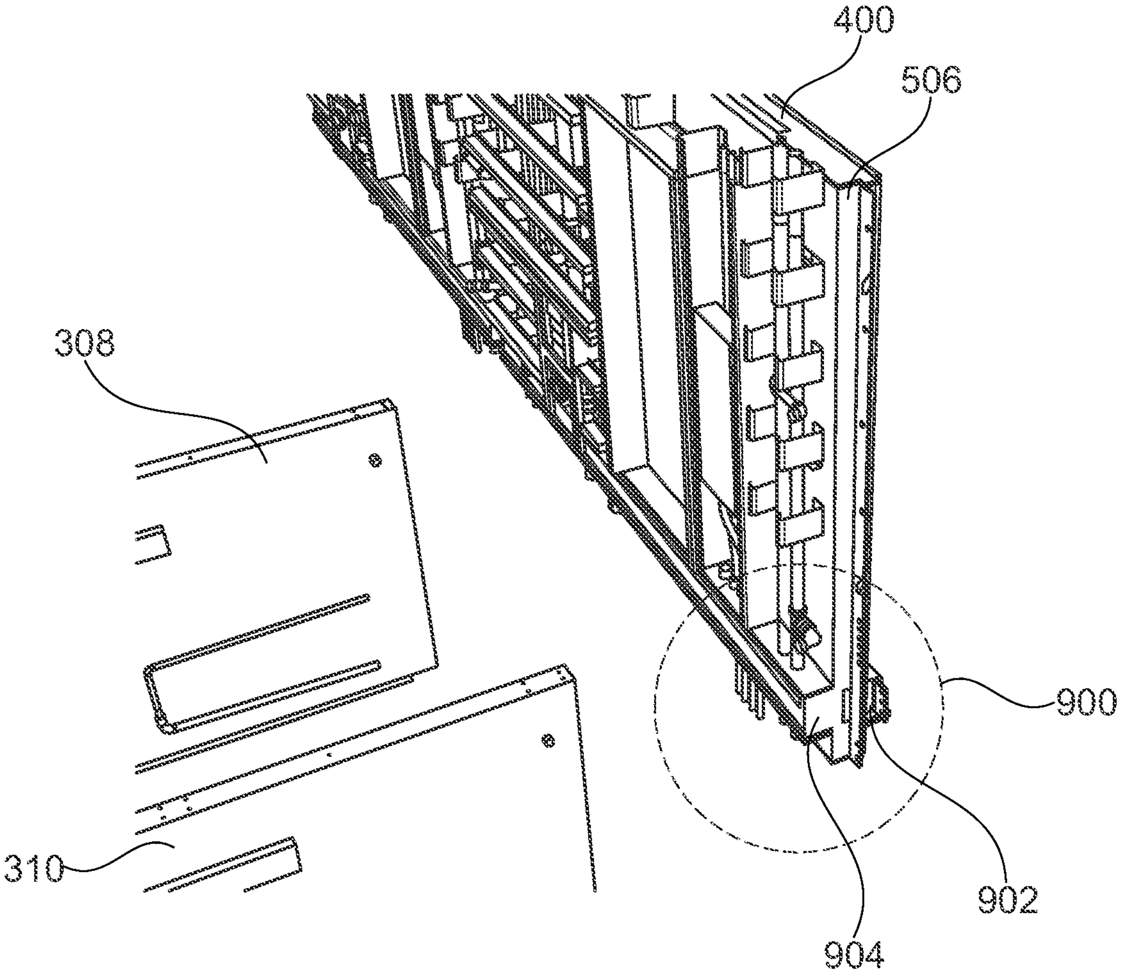
FIG. 9 is an exploded view showing a utility wall and load bearing walls, in accordance with some implementations.

FIG. 9 is an exploded view showing a utility wall (e.g., the utility wall 400) and load bearing walls (e.g., the end wall 308 and the demising wall 310), in accordance with some implementations. More particularly, FIG. 9 shows a configuration of the angle 506 around a region 900 depicted by the dashed circle, at about the floor level of the utility wall 400.

On a corridor side of the utility wall 400 that faces away from the ends of the walls 308/310, the angle 506 includes a first flange section 902 that extends towards the corridor. On a living space side of the utility wall 400 that faces the ends of the walls 308/310, the angle 506 includes a second flange section 904 that extends toward the living space.

Figure 10:
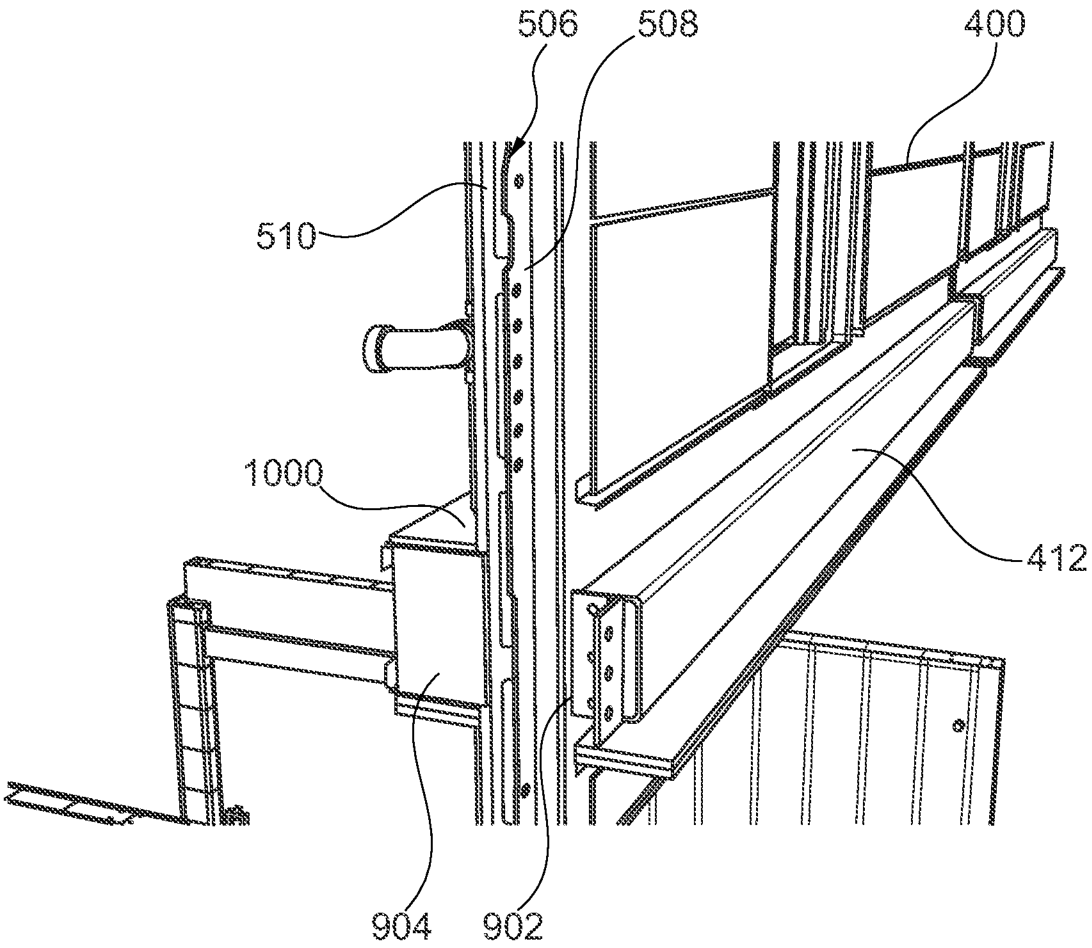
FIG. 10 shows further details of flange sections of an angle of the utility wall of FIG. 9, in accordance with some implementations.

FIG. 10 shows further details of flange sections (e.g., the first flange section 902 and the second flange section 904) of the angle 506 of the utility wall 400 of FIG. 9, in accordance with some implementations. The first flange section 902 lies in a plane parallel with the second vertical section 510 of the angle 506, and extends through a slot (not shown in FIG. 10) in the first vertical section 508 towards the corridor side of the utility wall 400. The first flange section 902 forms a protrusion that is part of an assembly to support the horizontal member 412 from which corridor panels 234 are hung during on site installation.

The first flange section 902 may be a steel plate with a generally rectangular shape, and may be affixed (off site at a factory) to the second vertical member 510 of the angle 506 by welding, bolting, etc. According to various implementations, the first flange section 902 may be the same gauge/thickness as the angle 506, or may be thicker with some example thicknesses being ¼ inch, 5/16 inch, ½ inch, etc., with nominal dimensions of 6 inches by 8 inches as an example.

The second flange section 904 is coplanar with and may be integrally formed from the same piece of metal as the second vertical section 510 of the angle 506. The second flange section 904 has a generally rectangular shape that extends toward the living space side of the utility 400, so as to cover the open ends of a box beam 1000 that is horizontally positioned at floor level along the length of the utility wall 400. The box beam 1000 may be formed with penetrations (shown next in FIG. 11) through which the vertical utilities 410 pass through.

The second flange section 904 may be welded or fastened with screws to the end of the box beam 1000 (off site at a factory). The second flange section 904 may have example nominal dimensions of 10 inches in height, 6 inches in length, and 18 gauge in thickness.

Figure 11:
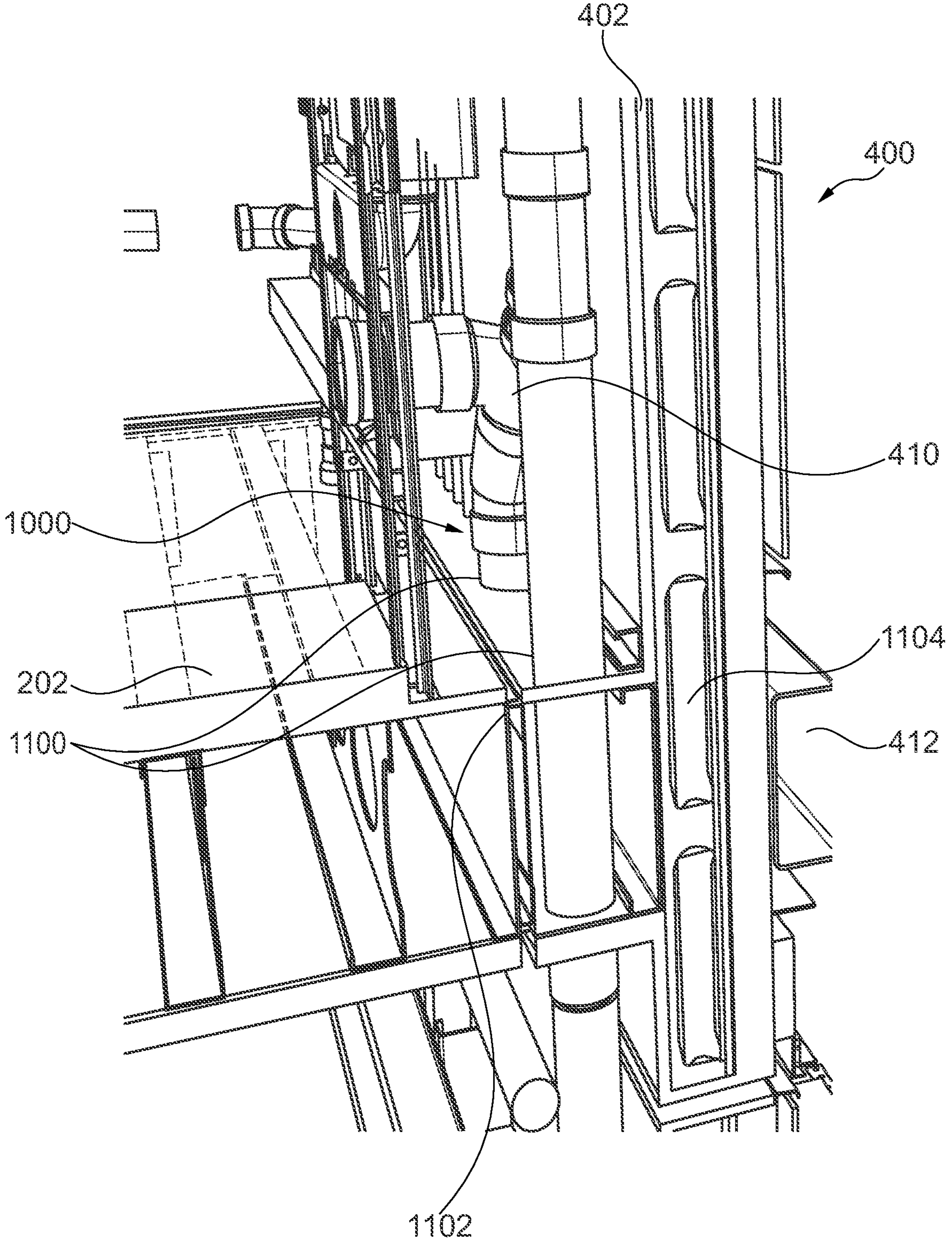
FIG. 11 is a cutaway view showing box beam components and connections of a utility wall, in accordance with some implementations.

FIG. 11 is a cutaway view showing box beam components and connections of the utility wall 400, in accordance with some implementations. In FIG. 11, the angle 506 has been cut away so as to reveal one of the studs 402 of the utility wall 400 and the components/features of the box beam 1000.

Vertical penetrations 1100 are formed in the box beam 1000, so that the utilities 410 (such as pipes, conduits, cables, etc.) may pass through the penetrations 1100 when being pre-installed on the utility wall 400 off site at a factory. Thus, the box beam 1000 with the penetrations 1100 provide some structural stability and alignment for mounting the utilities 410 on the utility wall 400.

Furthermore, the box beam provides a continuity (a first interface at location 1102) with the sheet metal of a diaphragm of a floor-ceiling panel 202, for purposes of transferring load from the diaphragm to structural components that can carry the load. A second interface 1104 is provided between the box beam 1000 and the horizontal member 1104, wherein the interface 1104 is positioned in each interstitial cavity/space between the studs 402.

Figure 12:
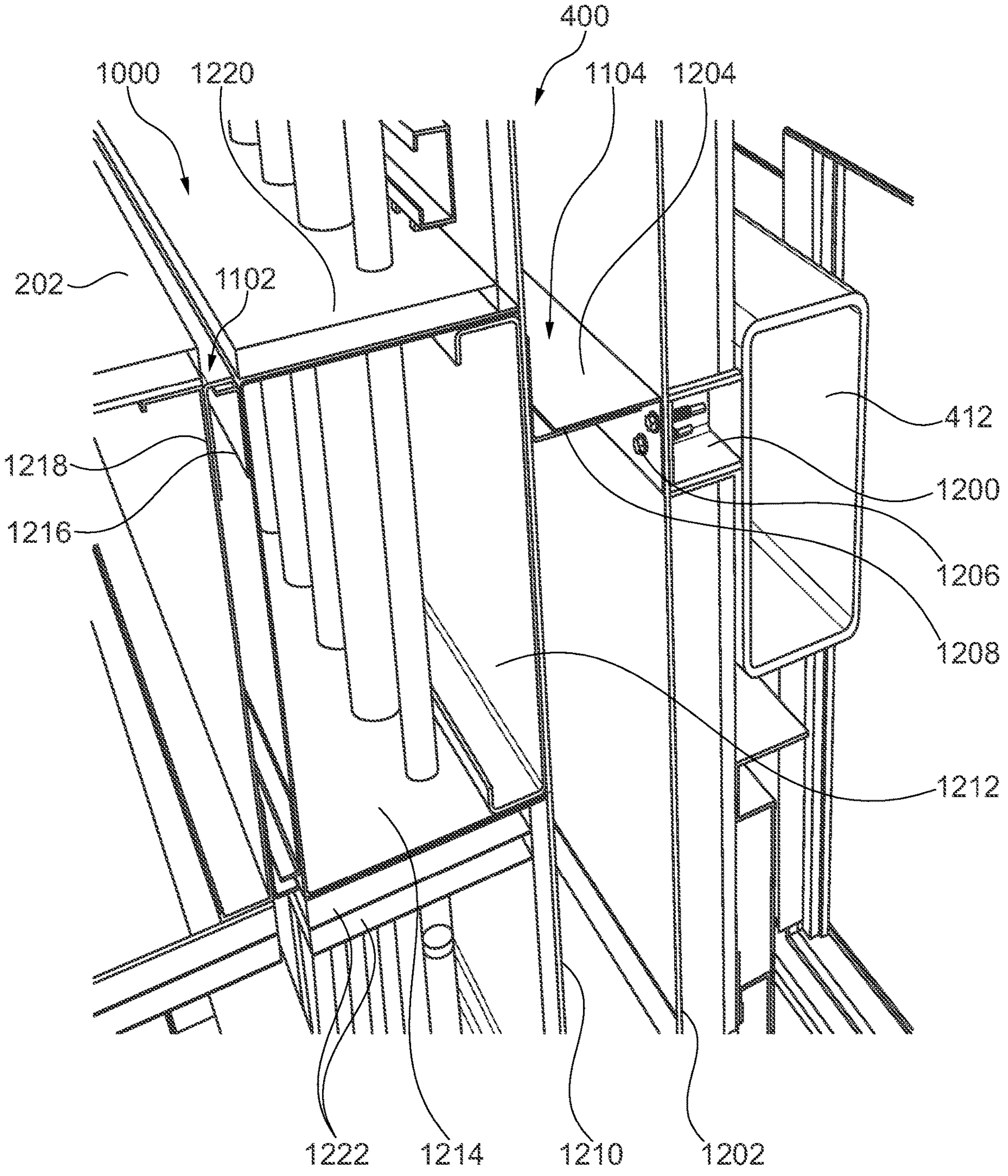
FIG. 12 is another cutaway view showing box beam components and connections of the utility wall, in accordance with some implementations.

FIG. 12 is another cutaway view showing box beam components and connections of the utility wall 400, in accordance with some implementations. In this cutaway view, the stud 402 has been cutaway and the view is magnified, so as to show further details of the box beam 1000, the location 1102, the interface 1104, and adjacent parts/connections.

During off site manufacturing, a horizontal tube 1200 is welded to the horizontal member 412. The tube 1200 may be an HSS tube with dimensions of 4 inches high by 2 inches wide by ⅛ inches in thickness, for example. The tube 1200 (and the horizontal member 412) are placed against one side of the first sheet of metal 1202 (steel sheet) of the utility wall 400, and a vertical section of an angle 1204 is placed against the other side of the first sheet of metal 1202. Screws 1206 or other fasteners then attach both the angle 1204 and the tube 1200 to the first sheet of metal 1202.

A vertical section of another angle 1208 is similarly attached (e.g. via screws) to the second sheet of metal 1210 (sheet metal) on the other side of the utility wall 400, such that the horizontal section of the angle 1208 is in contact with and underlies the horizontal section of the angle 1204. In this manner, the angles 1204 and 1208 and their respective connections/placement within the interstitial cavity/space between the studs 410 provides the interface 1104. According to some implementations, the connection 1214-1212-1208-1204-1200-412 is relevant in transferring diaphragm forces from floor-ceiling panels 202 to corridor panels.

A horizontal member such as a C channel 1212, for example having dimensions of 10 inches tall by 1-2 inches wide with 12 gauge thickness, is affixed to the studs 402 via screws or other type of fastener, with the opening of the C channel 1212 facing towards the floor-ceiling panel 202. A horizontal member such as another C channel 1214 is affixed to the C channel 1212 (such as via screws), with the opening of the C channel 1214 facing away from the floor-ceiling panel 202, thereby forming a rectangular box/tube profile for the box beam 1000.

At the location 1102, an angle 1216 is affixed (e.g., by welding) to the C channel 1214, such that a horizontal section of an angle 1218 of the floor-ceiling panel 202 overlies or rests upon a horizontal section of the angle 1216. A magnesium oxide layer or other layer 1220 (e.g. cement board) may be affixed to the top of the box beam 1000, and two layers 1222 of gypsum board may be affixed to the bottom of the box beam 1000, thereby matching the layering of the floor-panel 202. Mineral wool or other insulation material may also be placed within the box beam 1000 for matching the composition of the floor-ceiling panel 202.

Figure 13:
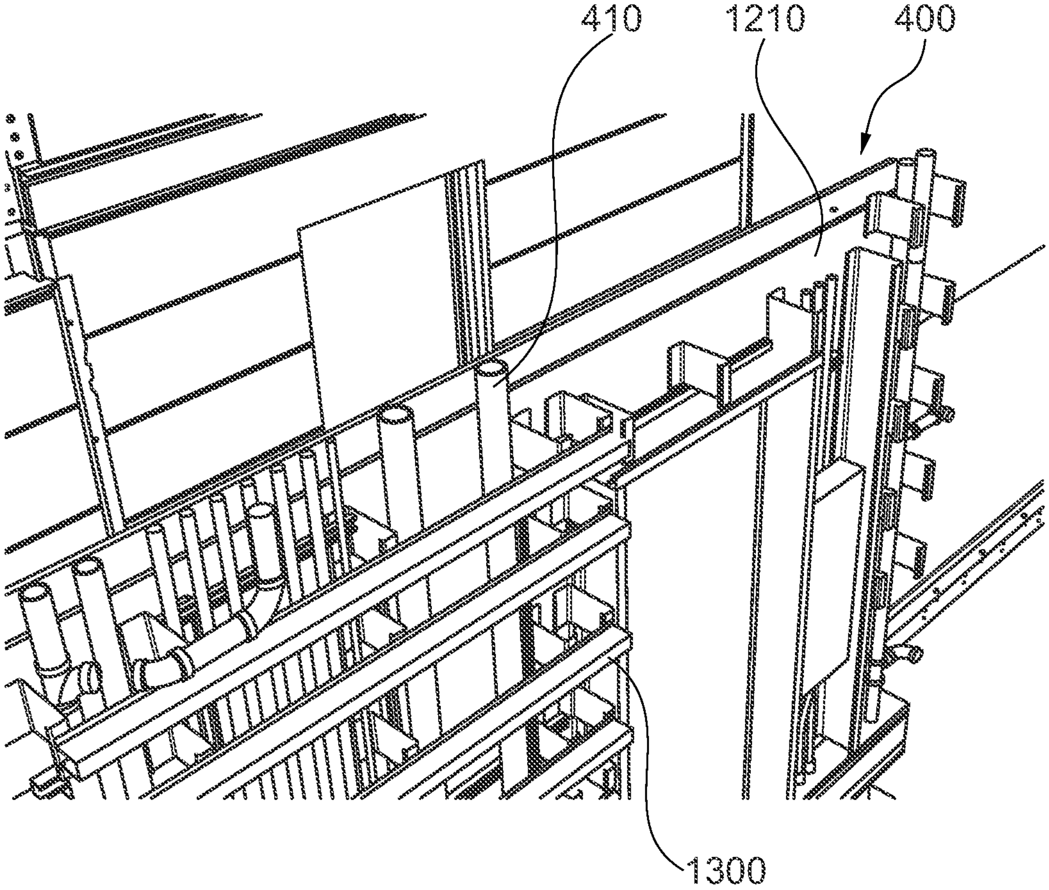
FIGS. 13-15 show arrangements for utilities in a utility wall, in accordance with some implementations.
Figure 14:
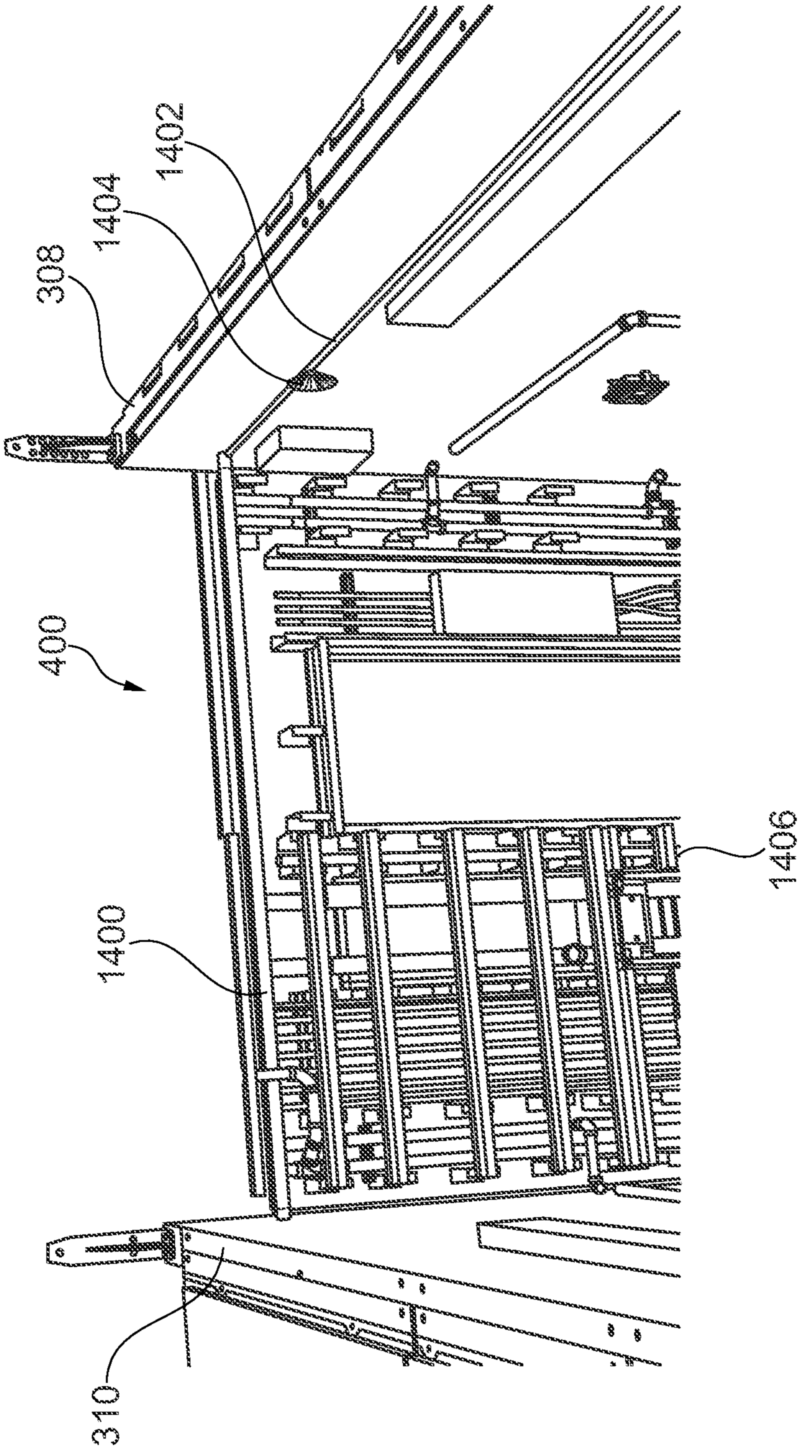
Figure 15:
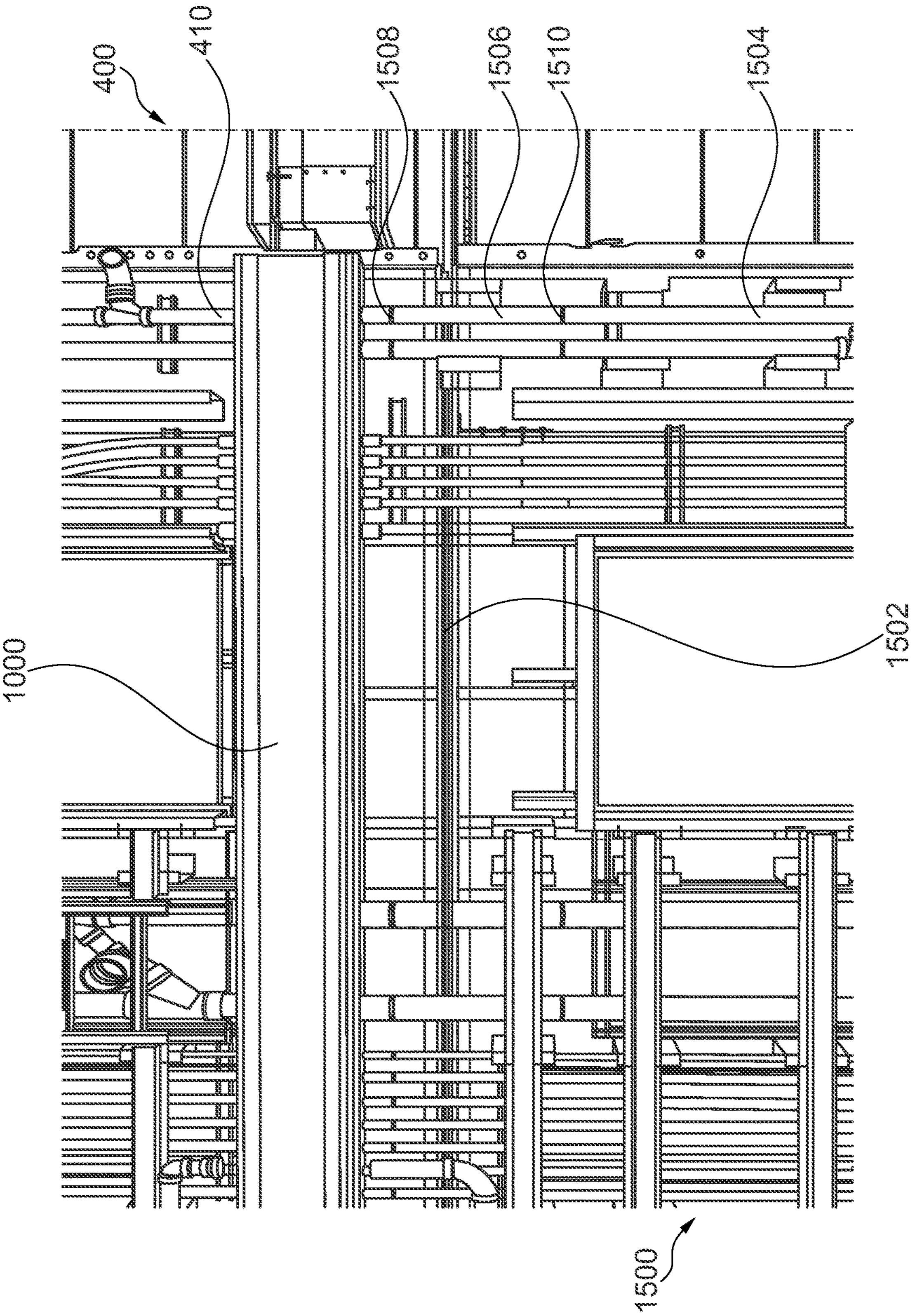

FIGS. 13-15 show example arrangements for utilities 410 in a utility wall (e.g., the utility wall 400), in accordance with some implementations. In FIG. 13, various configuration elements 1300 may be attached to the second sheet of metal 1200 (shown as being covered by interior sheathing board such as magnesium oxide, glass mat gypsum, or other material), to the utilities 410, and/or to each other. The configuration elements 1300 may include pedestals, spacers, dividers, brackets, frames, hat channels, risers, and the like that are configured to arrange, affix, support, position, etc. the utilities on the living space side of the second sheet of metal 1210.

FIG. 14 shows a fire sprinkler water supply line 1400 (one of the utilities 1400 provided by the utility wall 400) that runs horizontally along the top of the utility wall 400. The water supply line 1400 punches/enters into the end wall 308 and the demising wall 310. Vertical fire safety riser pipe 1406 is factory installed. The water supply line 1400 (horizontal pipe) may be field-installed between factory-installed stubs though walls 308/310. The water supply line 1400 may be kitted or otherwise included with the utility wall 400 in some implementations, such as during off site assembly or transport to the building site. Branch lines 1402, from the water supply line 1400, run horizontally along the end wall 308 so as to connect to sprinkler heads 1404 in the living space. The branch lines 1402 may also turn 90 degrees at end walls where penetrating to the adjoining space is not necessary. FIG. 15 shows the utility wall 400 being positioned above another utility wall 1500. A horizontal seam 1502 between the utility wall 400 and 1502 may be filled with foam or other filler material. In other implementations, it may be possible to omit filler material at the seam 1502.

The utilities 410 of the utility wall 400 are shown as penetrating downward through the box beam 1000. The utilities 410 may be joined with utilities 1504 of the lower utility wall 1500, using a splice section 1506 during field installation. The splice section 1506 may provide an upper splice connection 1508 to the utilities 410, and a lower splice connection 1510 to the utilities 1504.

The gap 318 that exists at the edge of the floor-panel (see FIG. 3) accommodates the box beam 1000. The gap 318 may not be present in some implementations. Working space to attach the splice section 1506 to the ends of the utilities 410 and 1504 during field installation, as well as providing the space to vertically run the utilities between stories, may be provided below floor level to avoid conflict with floor-ceiling panels. Moreover, the splice section 1506 and/or connectors at the splice connections 1508 and 1510 may be provided with sufficient flexibility when needed so as to sufficiently engage the splice section 1506 to the utilities 410 and 1504.

Figure 16:
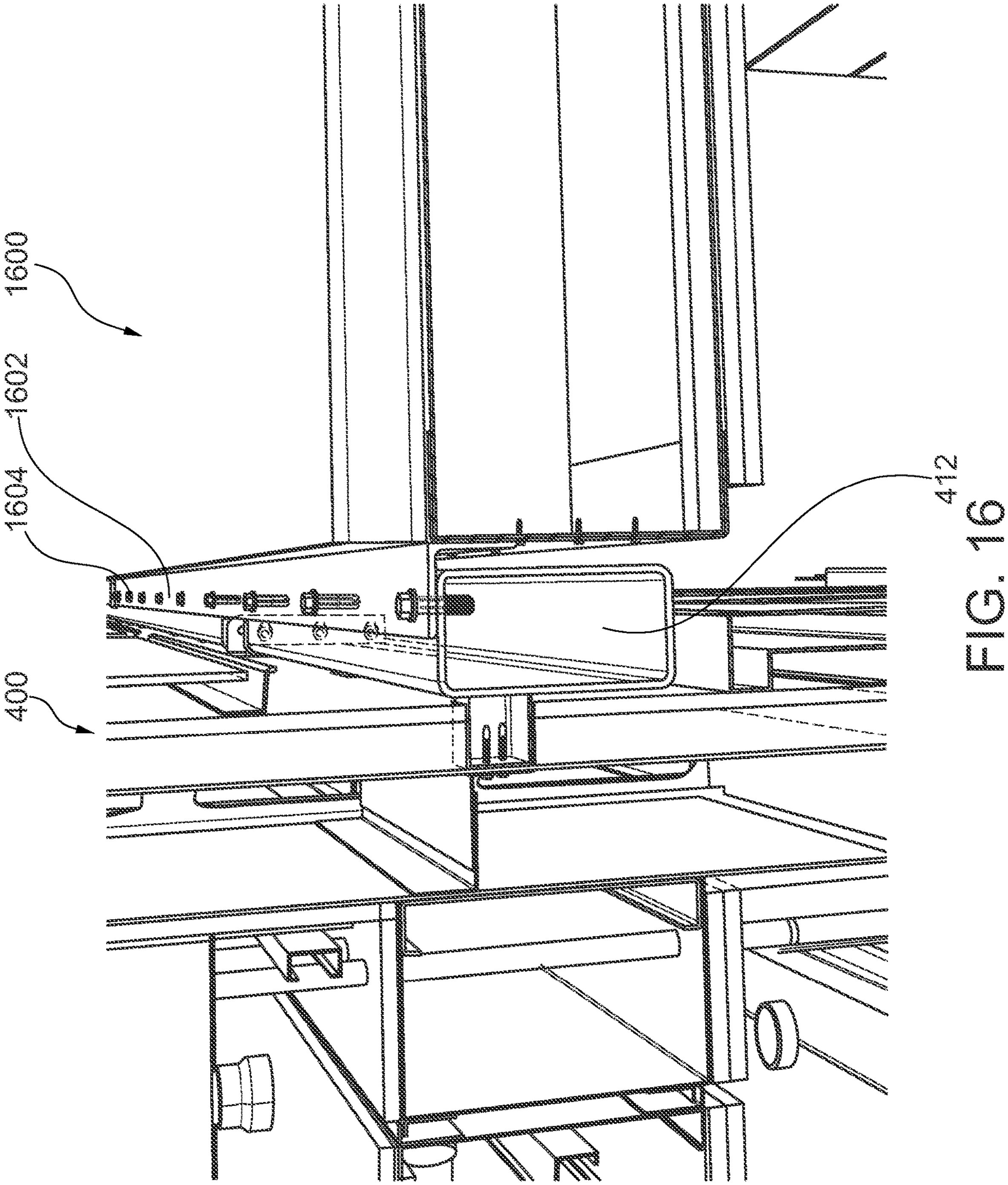
FIG. 16 shows a corridor panel hung from a utility wall, in accordance with some implementations.

FIG. 16 shows a corridor panel 1600 hung from a utility wall (e.g., the utility wall 400), in accordance with some implementations. The corridor panel 1600 includes an angle 1602 having a vertical section attached to a vertical edge of the corridor panel 1600. The corridor panel (during field installation) is positioned such that a horizontal section of the angle 1602 rests on the top surface of the horizontal member 412 of the utility wall 400. A similar positioning is concurrently performed on the other side of the corridor panel 1600, so as to place the angle 1602 on that side of the corridor panel 1600 on top of a horizontal member 412 of a utility wall on the other side of the corridor.

In foregoing manner, the corridor panel 1600 is thus hung between and from a pair of corridor panels 400. Screws, bolts, or other types of fasteners 1604 or welding may be used thereafter to firmly hold the corridor panel 1600 in place against the horizontal member 412.

Figure 17:
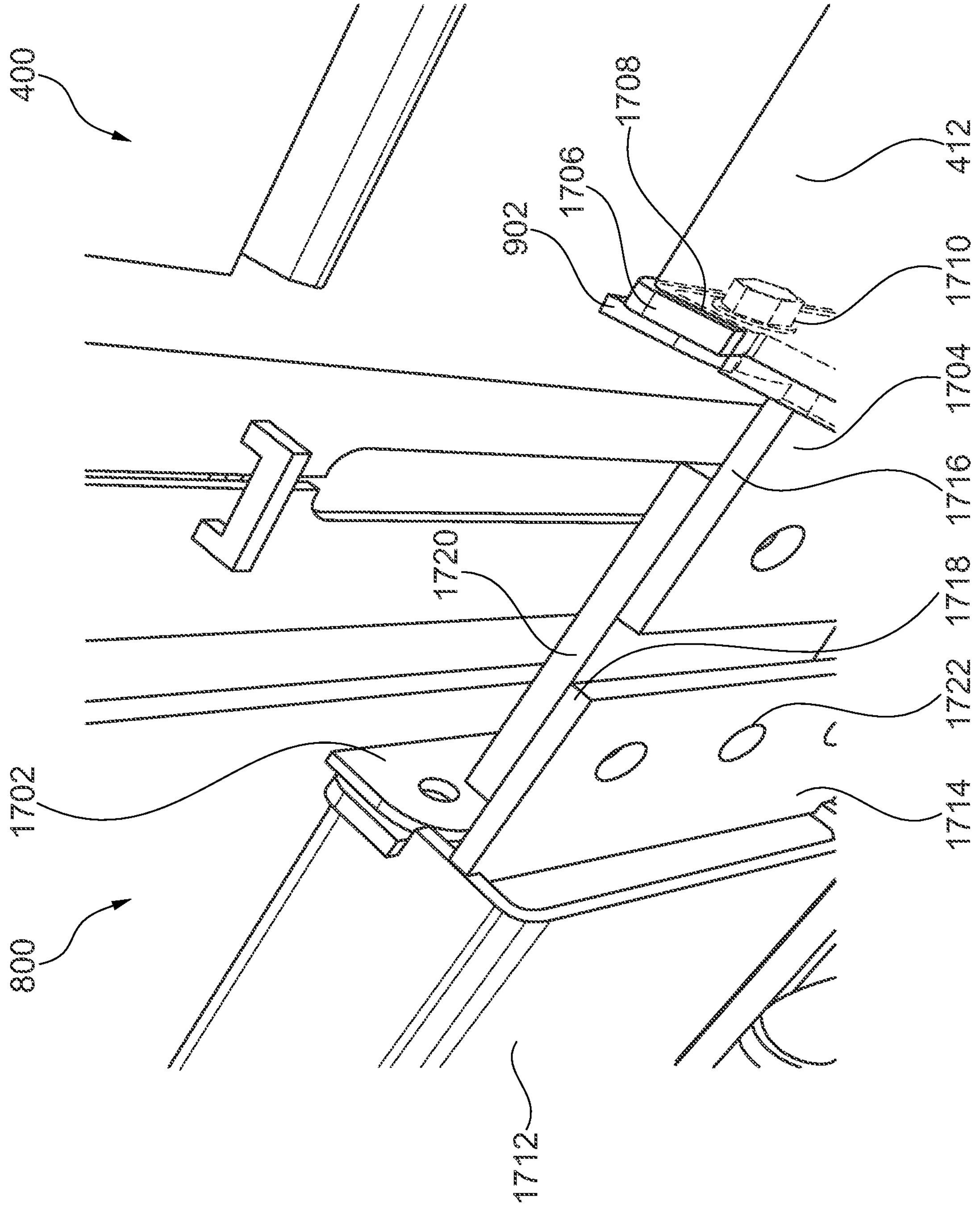
FIGS. 17 and 18 show linkages between horizontal members of utility walls, in accordance with some implementations.
Figure 18:
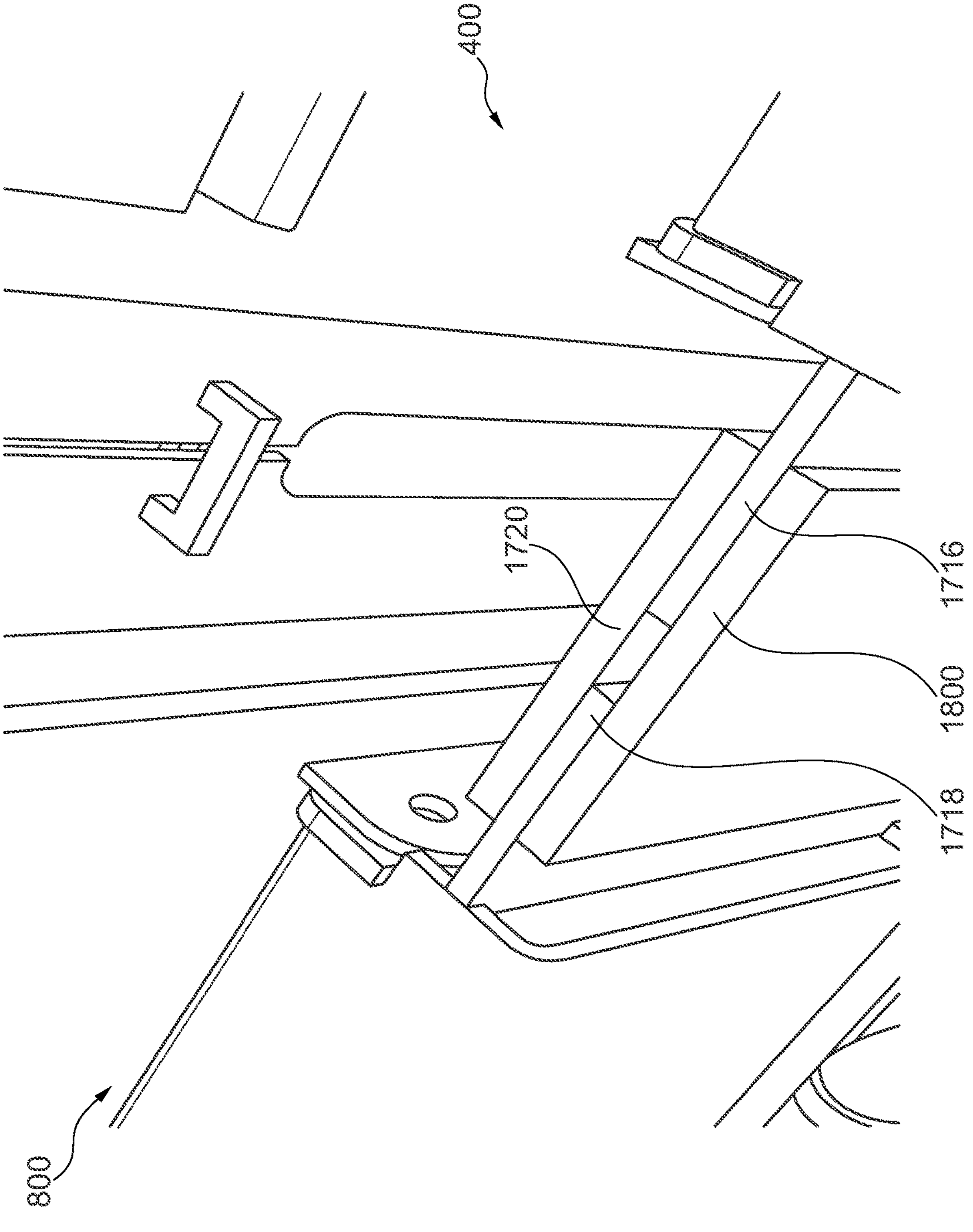

FIGS. 17 and 18 show linkages between horizontal members of utility walls, in accordance with some implementations. For instance and with reference to FIG. 8, the utility wall 400 is hung to the right of the utility wall 800 in FIG. 17 during field installation.

As shown in FIG. 17, the first flange section 902 of the utility wall 400 extends outwardly into the corridor. Similarly, a first flange section 1702 of the utility wall 800 extends outwardly into the corridor. Like the utility wall 400 having the pre-installed horizontal member 412, the utility wall 800 also has a pre-installed horizontal member 1712 that is linearly aligned with the horizontal member 412.

A bracket 1704 is fitted into the open end of the horizontal member 412 during off site manufacturing. The bracket 1704 has a first section 1706 that covers the opening of the horizontal member 412 and fits into a slot 1708 of the horizontal member 412, such that the end of the horizontal member 412 extends past the first section 1706. In some implementations, the slot 1708 is not present, and the bracket 1704 may be directly affixed (e.g., by welding or with fasteners) to the horizontal member 412.

The first section 1706 has a plurality of captive fasteners (e.g., a captive nut 1706) affixed to its side that is positioned inside of the horizontal member 412. A plurality of bolts are inserted during off-site manufacturing through respective holes in the first flange section 902 and the first section 1706, so as to engage the captive nuts 1710. This connection/arrangement is duplicated at the other end of the horizontal member 412, thereby securely holding the horizontal member 412 in place (on the face of the utility wall 400) for handling loads. The same connection/arrangement is provided for the horizontal member 1712 and its bracket 1714.

The brackets 1704 and 1714 may be made from metal that is the same or is thicker than the first flange sections 902 and 1702. Example thicknesses are ¼ inch, 5⁄16 inch, ½ inch, etc. are possible for the brackets 1704 and 1714.

During field installation and after the utility walls 400 and 800 have been hung, the respective horizontal members 412 and 1712 of these walls may be connected together, so as to provide a continuous linkage for stiffness and for a load path. Such connection may be provided via a steel plate 1720 that is positioned to bridge a gap between a second section 1716 of the bracket 1704 and a second section 1718 of the bracket 1714. The plate 1720 may have a plurality of captive nuts affixed thereto (on the side facing away from the corridor), so as to receive bolts inserted through corresponding holes 1722 through the second sections 1716 and 1718. When tightened, such bolts stiffen and strengthen the connections between the horizontal members 412 and 1712.

FIG. 18 shows an implementation wherein another plate 1800 is placed across the gap between the second sections 1716 and 1718. Thus, the plate 1800 and 1720 sandwich the gap and provide additional strength at the joint/connection, when bolts through the plates 1800 and 1720 are tightened during field installation.

Several advantages and features may be provided by the pre-manufactured single story utility walls disclosed herein. One advantage/feature is that the utility walls may be shipped in a vertical position, rather than laying down flat (which may need to be done when shipping larger multi-story walls). With the vertical positioning, the utility walls may thus be loaded onto transport vehicles, lifted/unloaded from the transport vehicles, and hung into position without any undue effort and repositioning/re-orientation being performed by cranes.

Another advantage/feature is that the utility walls act as connectors between load bearing walls on the same floor level, and are self-aligned with these walls due to being hung from these walls. Moreover, the single-story utility walls are able to be connected to each other horizontally such as for collecting and transferring lateral loads.

The present disclosure is not to be limited in terms of the particular embodiments described in this application, which are intended as illustrations of various aspects. Many modifications and embodiments can be made without departing from its spirit and scope. Functionally equivalent methods and apparatuses within the scope of the disclosure, in addition to those enumerated herein, are possible from the foregoing descriptions. Such modifications and embodiments are intended to fall within the scope of the appended claims. The present disclosure is to be limited only by the terms of the appended claims, along with the full scope of equivalents to which such claims are entitled. This disclosure is not limited to particular methods, which can, of course, vary. The terminology used herein is for the purpose of describing particular embodiments only, and is not intended to be limiting.

With respect to the use of substantially any plural and/or singular terms herein, the terms can be translated from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

If a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). Virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, the disclosure is also thereby described in terms of any individual member or subgroup of members of the Markush group.

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. All language such as "up to," "at least," "greater than," "less than," and the like include the number recited and refer to ranges which can be subsequently broken down into subranges as discussed above. Finally, a range includes each individual member. Thus, for example, a group having 1-3 items refers to groups having 1, 2, or 3 items. Similarly, a group having 1-5 items refers to groups having 1, 2, 3, 4, or 5 items, and so forth.

The herein described subject matter sometimes illustrates different components contained within, or connected with, different other components. Such depicted architectures are merely embodiments, and in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific embodiments of operably couplable include but are not limited to physically mateable and/or physically interacting components.

While various aspects and embodiments have been disclosed herein, other aspects and embodiments are possible. The various aspects and embodiments disclosed herein are for purposes of illustration and are not intended to be limiting.

What is claimed is:

1. A pre-manufactured utility wall for a multi-story building, the utility wall comprising:

a plurality of parallel vertical metal studs, including an end stud at each end of the utility wall;

a vertical member affixed to the end stud, wherein the vertical member includes a plurality of tabs that are sized and shaped for insertion into a corresponding plurality of slots of a vertical support member of a load bearing wall, and wherein the utility wall hangs from the load bearing wall after insertion of the plurality of tabs into the corresponding plurality of slots;

a horizontal member supported by the vertical member at a first side of the utility wall, wherein the horizontal member runs along a bottom portion of the utility wall, and wherein the utility wall supports a corridor panel when the corridor panel is hung from the horizontal member; and utilities installed at a second side of the utility wall that is opposite from the first side of the utility wall, wherein the utilities comprise non-terminated utilities componentry arranged to receive a connection from at least one water source and at least one electricity source.

2. The utility wall of claim 1, wherein the utility wall spans a single story in height.

3. The utility wall of claim 1, wherein the utilities and the studs are spaced apart from each other on parallel vertical planes.

4. The utility wall of claim 1, further comprising:

a first sheet of metal attached to the studs at the first side of the utility wall;

a second sheet of metal attached to the studs at a second side, opposite to the first side, of the utility wall, wherein the horizontal member is affixed to the vertical member and to the first sheet of metal, wherein the utilities are affixed to the second sheet of metal via configuration elements, and wherein the first and second sheets of metal provide fire proofing and sound proofing for the utility wall.

5. The utility wall of claim 1, wherein the utilities include a fire sprinkler water supply that runs horizontally along a top portion of the utility wall.

6. The utility wall of claim 1, wherein the vertical member is formed as an angle having a first vertical section and a second vertical section that are orthogonal to each other, and wherein the tabs are positioned at the first vertical section.

7. The utility wall of claim 6, further comprising a box beam located at the second side of the utility wall, wherein the angle includes a first flange section and a second flange section, wherein the first flange section extends from the first side of the utility wall and is configured to support the horizontal member, and wherein the second flange section extends from the second side of the utility wall and is affixed to the box beam.

8. The utility wall of claim 7, further comprising a bracket affixed to the horizontal member and to the first flange section of the angle, wherein the bracket is configured to be linked to a corresponding bracket affixed to a horizontal member of an adjacent utility wall, during field installation of the utility walls, so as to link the utility walls.

9. The utility wall of claim 7, wherein the box beam is affixed to the studs and forms a first interface with a diaphragm of a floor-ceiling panel to receive load transferred from the diaphragm, and forms a second interface with the horizontal member, and wherein the second interface is positioned within interstitial spaces between the studs.

10. The utility wall of claim 9, wherein the box beam is formed with a plurality of penetrations that are each positioned and shaped to receive a corresponding one of the utilities that run through the box beam.

11. A multi-story building, comprising:

a plurality of pre-manufactured load bearing walls that each include a vertical support member; and a pre-manufactured utility wall that is hung from and that connects two of the plurality of load bearing walls, wherein the utility wall includes:

a plurality of parallel vertical metal studs, including an end stud at each end of the utility wall;

a vertical member affixed to the end stud, wherein the vertical member includes a plurality of tabs that are sized and shaped for insertion into a corresponding plurality of slots of the vertical support member of each of the two load bearing walls, and wherein the utility wall hangs from the two load bearing wall after insertion of the plurality of tabs into the corresponding plurality of slots;

a horizontal member supported by the vertical member at a first side of the utility wall, wherein the horizontal member runs along a bottom portion of the utility wall, and wherein the utility wall supports a corridor panel when the corridor panel is hung from the horizontal member; and utilities installed at a second side of the utility wall that is opposite from the first side of the utility wall.

12. The building of claim 11, wherein the building has five or less stories, and wherein the utility wall spans a single story.

13. The building of claim 11, wherein the corridor panel is amongst a plurality of corridor panels along a corridor of the building, and wherein the corridor panel is hung from the utility wall at a first side of the corridor and is hung from another utility wall at a second side of the corridor opposite from the first side of the corridor.

14. The building of claim 11, wherein:

the utility wall is a first utility wall, the building further comprises a second utility wall positioned horizontally adjacent to the first utility wall and hung from the vertical member. and the horizontal member of the first utility wall is linked to a horizontal member of the second utility wall that is linearly aligned with the horizontal member of the first utility wall.

15. The building of claim 11, further comprising a pre-manufactured floor- ceiling panel, wherein the floor-ceiling panel is sized to provide a gap to accommodate the utilities installed at the second side of the utility wall.

16. The building of claim 15, wherein:

the utility wall is a first utility wall, the building further comprises a second utility wall positioned below the first utility wall, the utilities of the first utility wall are spliced with utilities of the second utility wall by a splice connection at the gap, non-terminated utilities componentry is further arranged to receive a connection from a pressurized fire-safety-water sprinkler system, and the utilities include at least one of plumbing componentry for indoor plumbing, electrical componentry for indoor lighting, plumbing componentry for in-floor heating, plumbing componentry for sprinklers.

17. A method of manufacturing a utility wall for a multi-story building having load bearing walls, the method comprising:

forming a panel frame that includes a plurality of parallel vertical metal studs, wherein the studs include an end stud at each end of the utility wall;

affixing a vertical member to the end stud, wherein the vertical member includes a plurality of tabs that are sized and shaped for insertion into a corresponding plurality of slots of a vertical support member of a load bearing wall of the multi-story building, and wherein the utility wall is hung from the load bearing wall after insertion of the plurality of tabs into the corresponding plurality of slots;

affixing a horizontal member to the vertical member at a first side of the utility wall, wherein the horizontal member runs along a bottom portion of the utility wall and is supported by the vertical member, and wherein the utility wall supports a corridor panel when the corridor panel is hung from the horizontal member; and installing utilities at a second side of the utility wall that is opposite from the first side of the utility wall.

18. The method of claim 17, further comprising:

forming the vertical member as an angle having a first vertical section and a second vertical section that are orthogonal to each other, and wherein the tabs are positioned at the first vertical section;

affixing a box beam to the second side of the utility wall, wherein the angle includes a first flange section and a second flange section, wherein the first flange section extends from the first side of the utility wall and is configured to support the horizontal member, and wherein the second flange section extends from the second side of the utility wall and is affixed to the box beam; and forming a plurality of penetrations in the box beam that are each positioned and shaped to receive a corresponding one of the utilities that run through the box beam.

19. The method of claim 17, further comprising affixing a bracket to the horizontal member and to a flange section of an angle, wherein the bracket is configured to be linked to a corresponding bracket affixed to a horizontal member of an adjacent utility wall, during field installation of the utility walls, so as to link the utility walls.

20. The method of claim 17, wherein the utility wall spans a single story in height.

* * * * *